US012502770B2

(12) United States Patent
Nie et al.

(10) Patent No.: US 12,502,770 B2
(45) Date of Patent: Dec. 23, 2025

(54) RESILIENT MULTI-ROBOT SYSTEM WITH SOCIAL LEARNING FOR SMART FACTORIES

(71) Applicant: University of South Florida, Tampa, FL (US)

(72) Inventors: Zixiang Nie, Tampa, FL (US); Kwang-Cheng Chen, Tampa, FL (US)

(73) Assignee: University of South Florida, Tampa, FL (US)

( * ) Notice: Subject to any disclaimer, the term of this patent is extended or adjusted under 35 U.S.C. 154(b) by 327 days.

(21) Appl. No.: 18/193,901

(22) Filed: Mar. 31, 2023

(65) Prior Publication Data

US 2023/0311312 A1  Oct. 5, 2023

Related U.S. Application Data

(60) Provisional application No. 63/362,235, filed on Mar. 31, 2022.

(51) Int. Cl.
*B25J 9/16* (2006.01)

(52) U.S. Cl.
CPC .............. *B25J 9/163* (2013.01); *B25J 9/161* (2013.01); *B25J 9/1653* (2013.01); *B25J 9/1682* (2013.01); *G05B 2219/39146* (2013.01); *G05B 2219/39162* (2013.01)

(58) Field of Classification Search
CPC . B25J 9/163; B25J 9/161; B25J 9/1653; B25J 9/1682

USPC ......................................................... 700/250
See application file for complete search history.

(56) References Cited

U.S. PATENT DOCUMENTS

| 10,906,188 | B1 * | 2/2021 | Sun .................. B25J 9/1671 |
| 2020/0133224 | A1 * | 4/2020 | Popp .................. G05B 19/188 |
| 2021/0107151 | A1 * | 4/2021 | Wouhaybi ............ B25J 9/1661 |
| 2021/0107152 | A1 * | 4/2021 | Honkote ............... B25J 9/1661 |

OTHER PUBLICATIONS

L. Li, K. Ota and M. Dong, "Deep Learning for Smart Industry: Efficient Manufacture Inspection System With Fog Computing," in IEEE Transactions on Industrial Informatics, vol. 14, No. 10, pp. 4665-4673, Jun. 2018, doi: 10.1109/TII.2018.2842821. (Year: 2018 ).*

(Continued)

*Primary Examiner* — Ramon A. Mercado
*Assistant Examiner* — Moya Ly
(74) *Attorney, Agent, or Firm* — Meunier Carlin & Curfman LLC

(57) ABSTRACT

A system and methods for operating a multi-robot system (MRS) are disclosed. In some aspects, each robot of the MRS can: determine a local system regret state belief based on local evidence obtained by the robot itself and social evidence provided by other robots in a social community, determine a local system drift state belief based on the local system regret state belief, determine a next action based on the local system regret state belief and the local system drift state belief, and execute the next action. Local system regret state belief is generally an estimation of a system regret state for the MRS. Local system drift state belief is generally an estimate of a system drift state for the MRS.

18 Claims, 17 Drawing Sheets

(56) References Cited

OTHER PUBLICATIONS

K. -C. Chen and H. -M. Hung, "Wireless Robotic Communication for Collaborative Multi-Agent Systems," ICC 2019—2019 IEEE International Conference on Communications (ICC), Shanghai, China, Jul. 2019, pp. 1-7, doi: 10.1109/ICC.2019.8761140. (Year: 2019).*
K. Gokcesu and H. Gokcesu, "Generalized Huber Loss for Robust Learning and its Efficient Minimization for a Robust Statistics", arXiv, Aug. 2021, https://doi.org/10.48550/arXiv.2108.12627 (Year: 2021).*
K. -C. Chen, S. -C. Lin, J. -H. Hsiao, C. -H. Liu, A. F. Molisch and G. P. Fettweis, "Wireless Networked Multirobot Systems in Smart Factories," in Proceedings of the IEEE, vol. 109, No. 4, pp. 468-494, Nov. 2020, doi: 10.1109/JPROC.2020.3033753. (Year: 2020).*
Y. Liu and G. -H. Yang, "Resilient Event-Triggered Distributed State Estimation for Nonlinear Systems Against DOS Attacks," in IEEE Transactions on Cybernetics, vol. 52, No. 9, pp. 9076-9089, Feb. 2021, doi: 10.1109/TCYB.2021.3051963. (Year: 2021).*
K. C. Chen, S. C. Lin, J. H. Hsiao, C. H. Liu, A. F. Molisch, and G. P. Fettweis, "Wireless networked multirobot systems in smart factories," Proceedings of the IEEE, vol. 109, No. 4, pp. 468-494, 2021.
J. Wan, X. Li, H. N. Dai, A. Kusiak, M. Mart'inez-Garc'ia, and D. Li, "Artificial-intelligence-driven customized manufacturing factory: Key technologies, applications, and challenges," Proceedings of the IEEE, vol. 109, No. 4, pp. 377-398, 2021.
F. Psarommatis, M. Danishvar, A. Mousavi, and D. Kiritsis, "Cost-based decision support system: A dynamic cost estimation of key performance indicators in manufacturing," IEEE Transactions on Engineering Management, pp. 1-13, 2022.
S. D. Cataldo, S. Lee, E. Macii, and B. Vogel-Heuser, "Leading information and communication technologies for smart manufacturing: Facing the new challenges and opportunities of the 4th industrial revolution," Proceedings of the IEEE, vol. 109, No. 4, pp. 320-325, 2021.
A. Prorok, M. Malencia, L. Carlone, G. S. Sukhatme, B. M. Sadler, and V. Kumar, "Beyond robustness: A taxonomy of approaches towards resilient multi-robot systems," arXiv preprint arXiv:2109.12343, 2021.
Z. Nie and K.-C. Chen, "Hypergraphical real-time multi-robot task allocation in a smart factory," IEEE Transactions on Industrial Informatics, pp. 1-1, 2021.
Nie, Zixiang, and Kwang-Cheng Chen. "Distributed Coordination by Social Learning in the Multi-Robot Systems of a Smart Factory." 2021 IEEE Global Communications Conference (GLOBECOM). IEEE, 2021.
T. Sun, C. Liu, B. Lian, p. Wang, and Y. Song, "Calibration for precision kinematic control of an articulated serial robot," IEEE Transactions on Industrial Electronics, vol. 68, No. 7, pp. 6000-6009, 2021.
C.-Y. Hsu, W.-J. Chen, and J.-C. Chien, "Similarity matching of wafer bin maps for manufacturing intelligence to empower industry 3.5 for semiconductor manufacturing," Computers & Industrial Engineering, vol. 142, p. 106358, 2020.
A. Mustafa and H. Modares, "Attack analysis and resilient control design for discrete-time distributed multi-agent systems," IEEE Robotics and Automation Letters, vol. 5, No. 2, pp. 369-376, 2020.
J. H. Hsiao and K. C. Chen, "Network analysis of collaborative cyberphysical multi-agent smart manufacturing systems : Invited paper," in 2019 IEEE/CIC International Conference on Communications in China (ICCC). IEEE, 2019, pp. 219-224.
V. Matta, A. Santos, and A. H. Sayed, "Graph learning under partial observability," Proceedings of the IEEE, vol. 108, No. 11, pp. 2049-2066, 2020.
C. Landgraf, K. Ernst, G. Schleth, M. Fabritius, and M. F. Huber, "A hybrid neural network approach for increasing the absolute accuracy of industrial robots," in 2021 IEEE 17th International Conference on Automation Science and Engineering (CASE). IEEE, 2021, pp. 468-474.
Y. K. Teoh, S. S. Gill, and A. K. Parlikad, "Iot and fog computing based predictive maintenance model for effective asset management in industry 4.0 using machine learning," IEEE Internet of Things Journal, pp. 1-1, 2021.
D. Zhang, N. Zhang, N. Ye, J. Fang, and X. Han, "Hybrid learning algorithm of radial basis function networks for reliability analysis," IEEE Transactions on Reliability, vol. 70, No. 3, pp. 887-900, 2021.
D. Zhang, G. Feng, Y. Shi, and D. Srinivasan, "Physical safety and cyber security analysis of multi-agent systems: A survey of recent advances," IEEE/CAA Journal of Automatica Sinica, vol. 8, No. 2, pp. 319-333, 2021.
W. Li, H. Zhang, Y. Zhou, and Y.Wang, "Bipartite formation tracking for multi-agent systems using fully distributed dynamic edge-event-triggered protocol," IEEE/CAA Journal of Automatica Sinica, pp. 1-7, 2022.
X. Wan, Z. Wang, M. Wu, and X. Liu, "$H\infty$ State Estimation for Discrete-Time Nonlinear Singularly Perturbed Complex Networks Under the Round-Robin Protocol," IEEE Transactions on Neural Networks and Learning Systems, vol. 30, No. 2, pp. 415-426, 2019.
Y. Liu and G.-H. Yang, "Resilient event-triggered distributed state estimation for nonlinear systems against dos attacks," IEEE Transactions on Cybernetics, pp. 1-14, 2021.
P. Duan, G. Lv, Z. Duan, and Y. Lv, "Resilient state estimation for complex dynamic networks with system model perturbation," IEEE Transactions on Control of Network Systems, vol. 8, No. 1, pp. 135-146, 2021.
C. Chen, K. Xie, F. L. Lewis, S. Xie, and A. Davoudi, "Fully distributed resilience for adaptive exponential synchronization of heterogeneous multiagent systems against actuator faults," IEEE Transactions on Automatic Control, vol. 64, No. 8, pp. 3347-3354, 2019.
H. Liang, Y. Zhou, H. Ma, and Q. Zhou, "Adaptive distributed observer approach for cooperative containment control of nonidentical networks," IEEE Transactions on Systems, Man, and Cybernetics: Systems, vol. 49, No. 2, pp. 299-307, 2019.
A. Mitra, J. A. Richards, S. Bagchi, and S. Sundaram, "Resilient distributed state estimation with mobile agents: overcoming byzantine adversaries, communication losses, and intermittent measurements," Autonomous Robots, vol. 43, No. 3, pp. 743-768, 2019.
A. Mitra, F. Ghawash, S. Sundaram, and W. Abbas, "On the impacts of redundancy, diversity, and trust in resilient distributed state estimation," IEEE Transactions on Control of Network Systems, vol. 8, No. 2, pp. 713-724, 2021.
H. Zhang, J. Hu, H. Liu, X. Yu, and F. Liu, "Recursive state estimation for time-varying complex networks subject to missing measurements and stochastic inner coupling under random access protocol," Neurocomputing, vol. 346, pp. 48-57, 2019.
V. Bordignon, V. Matta, and A. H. Sayed, "Adaptive social learning," IEEE Transactions on Information Theory, vol. 67, No. 9, pp. 6053-6081, 2021.
C. Henkel, J. Abbenseth, and M. Toussaint, "An optimal algorithm to solve the combined task allocation and path finding problem," arXiv preprint arXiv:1907.10360, 2019.
M. Otte, M. J. Kuhlman, and D. Sofge, "Auctions for multi-robot task allocation in communication limited environments," Autonomous Robots, vol. 44, No. 3, pp. 547-584, 2020.
A. Grover and J. Leskovec, "node2vec: Scalable feature learning for networks," in Proceedings of the 22nd ACM SIGKDD international conference on Knowledge discovery and data mining, 2016, pp. 855-864.
H. Touzani, H. Hadj-Abdelkader, N. S'eguy, and S. Bouchafa, "Multirobot task sequencing automatic path planning for cycle time optimization: Application for car production line," IEEE Robotics and Automation Letters, vol. 6, No. 2, pp. 1335-1342, 2021.
J. A. Marvel, R. Bostelman, and J. Falco, "Multi-robot assembly strategies and metrics," ACM Comput. Surv., vol. 51, No. 1, Jan. 2018. [Online]. Available: https://doi.org/10.1145/3150225.

(56) References Cited

OTHER PUBLICATIONS

L. Li, K. Ota, and M. Dong, "Deep learning for smart industry: Efficient manufacture inspection system with fog computing," IEEE Transactions on Industrial Informatics, vol. 14, No. 10, pp. 4665-4673, 2018.

A. H. Sayed, "Adaptation, learning, and optimization over networks," Foundations and Trends in Machine Learning, vol. 7, No. Article, pp. 311-801, 2014.

K. Gokcesu and H. Gokcesu, "Generalized huber loss for robust learning and its efficient minimization for a robust statistics," arXiv preprint arXiv:2108.12627, 2021.

S. Liu, N. Gupta, and N. H. Vaidya, "Approximate byzantine faulttolerance in distributed optimization," in Proceedings of the 2021 ACM Symposium on Principles of Distributed Computing, ser. PODC'21. New York, NY, USA: Association for Computing Machinery, 2021, p. 379-389. [Online]. Available: https://doi.org/10.1145/3465084.3467902.

L. Alfantoukh, Y. Ruan, and A. Durresi, "Multi-stakeholder consensus decision-making framework based on trust: A generic framework," in 2018 IEEE 4th International Conference on Collaboration and Internet Computing (CIC). IEEE, 2018, pp. 472-479.

D. Cavaliere, J. A. Morente-Molinera, V. Loia, S. Senatore, and E. Herrera-Viedma, "Collective scenario understanding in a multivehicle system by consensus decision making," IEEE Transactions on Fuzzy Systems, vol. 28, No. 9, pp. 1984-1995, 2020.

Malus, Andreja, and Dominik Kozjek. "Real-time order dispatching for a fleet of autonomous mobile robots using multi-agent reinforcement learning." CIRP annals 69.1 (2020): 397-400.

Agrawal, Akash, et al. "A multi-agent reinforcement learning framework for intelligent manufacturing with autonomous mobile robots." Proceedings of the Design Society 1 (2021): 161-170.

Hu, Hongtao, et al. "Anti-conflict AGV path planning in automated container terminals based on multi-agent reinforcement learning." International Journal of Production Research 61.1 (2023): 65-80.

Popper, Jens, Vassilios Yfantis, and Martin Ruskowski. "Simultaneous production and agv scheduling using multi-agent deep reinforcement learning." Procedia CIRP 104 (2021): 1523-1528.

Yun, Won Joon, et al. "Cooperative multiagent deep reinforcement learning for reliable surveillance via autonomous multi-UAV control." IEEE Transactions on Industrial Informatics 18.10 (2022): 7086-7096.

\* cited by examiner

RESILIENT MULTI-ROBOT SYSTEM WITH SOCIAL LEARNING FOR SMART FACTORIES

CROSS-REFERENCE TO RELATED APPLICATIONS

This application claims the benefit of and priority to U.S. Provisional Patent App. No. 63/362,235, filed Mar. 31, 2022, which is incorporated herein by reference in its entirety.

BACKGROUND

Intelligent multi-robot systems (MRS) and multi-agent systems (MAS)—collectively referred to herein as MRSs—are a growing field of interest with respect to smart manufacturing and smart factories. Intelligent MRSs can, for example, meet desired characteristics in modern production, such as high productivity, resource efficiency, flexibility, agility, and sustainability. However, increasing reliance on MRSs raises concerns about the robustness, resilience, and security of smart factories. The goal of robustness is to preserve system objective performance under stochastic dynamics. The goal resilience, on top of robustness, is to preserve system objective performance under abrupt disturbance from the environment or even inside the system.

SUMMARY

One implementation of the present disclosure is a method of operating a first robot in a multi-robot system, wherein the first robot and at least one additional robot of the multi-robot system form a community in a social network. The method generally includes: determining, by the first robot, a local system regret state belief based on local evidence obtained by the first robot and social evidence provided by the at least one additional robot in the social community, wherein the local system regret state belief is an estimation of a system regret state for the multi-robot system; determining, by the first robot, a local system drift state belief based on the local system regret state belief, wherein the local system drift state belief is an estimate of a system drift state for the multi-robot system; determining, by the first robot, a next action based on the based on the local system regret state belief and the local system drift state belief; and executing, by the first robot, the next action.

Another implementation of the present disclosure is a control system for a first robot in a multi-robot system, wherein the first robot and at least one additional robot of the multi-robot system form a community in a social network. The control system generally includes a processor and memory having instructions stored thereon that, when executed by the processor, cause the control system to: determine a local system regret state belief based on local evidence obtained by the first robot and social evidence provided by the at least one additional robot in the social community, wherein the local system regret state belief is an estimation of a system regret state for the multi-robot system; determine a local system drift state belief based on the local system regret state belief, wherein the local system drift state belief is an estimate of a system drift state for the multi-robot system; determine a next action for the first robot based on the based on the local system regret state belief and the local system drift state belief; and control the first robot to execute the next action.

Yet another implementation of the present disclosure is a non-transitory computer readable medium having instructions stored thereon that, when executed by a processor, cause a device to: determine, for a first robot in a multi-robot system, a local system regret state belief, wherein the first robot and at least one additional robot of the multi-robot system form a community in a social network, wherein the local system regret state belief is determined based on local evidence obtained by the first robot and social evidence provided by the at least one additional robot in the social community, and wherein the local system regret state belief is an estimation of a system regret state for the multi-robot system; determine, for the first robot, a local system drift state belief based on the local system regret state belief, wherein the local system drift state belief is an estimate of a system drift state for the multi-robot system; determine, for the first robot, a next action based on the based on the local system regret state belief and the local system drift state belief; and control the first robot to execute the next action.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

Figure 1A:
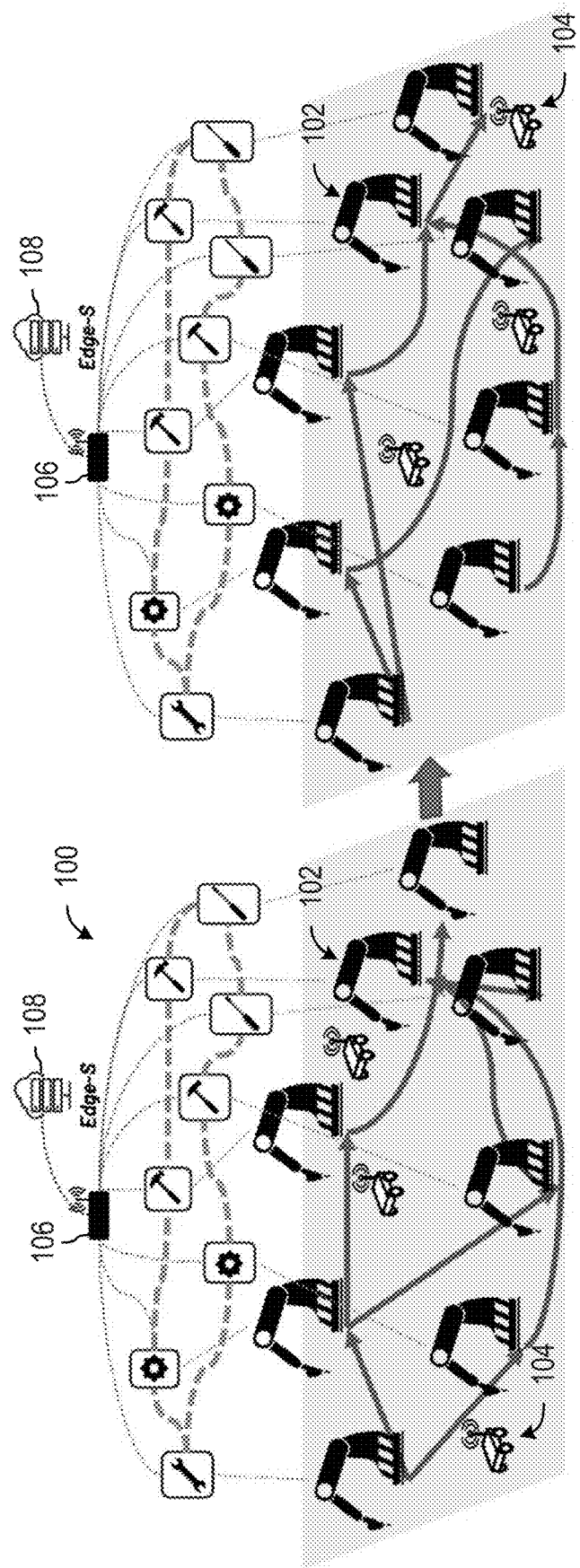
FIGS. 1A and 1B are diagrams of an example hybrid multi-robot system (MRS), according to some implementations.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Each production robot in an MRS is generally dedicated to a specific manufacturing process and/or can be reconfigured to collaborate with other production robots and transportation robots to fulfill fabrication of a product, device, or component. Edge computing, mobile computing, Cyber-Physical Systems (CPS), Information Communication Technologies (ICT), Artificial Intelligence (AI), and wireless communication and networks can endow MRS with real-time configuration, heterogeneity and collaboration. In some cases, MRS utilize an upper-level or higher-level smart agent on a dedicated computing device for robot scheduling and task assignments through hypergraphical multi-robot task allocation (MRTA), which orchestrates the reconfiguration of a heterogeneous, collaborative multi-robot system to accommodate batch customized production. Meanwhile, each robot can include an individual "smart agent" configured to receive the task assignment, perform reconfiguration, and then implement the new task assignment and collaboration pattern with individual action decision-making. Benefitting from heterogeneity and collaboratively, each robot may collaborate with different robot teams determined by MRTA to accommodate production demands in wide range of type, number and deadlines. However, this flexibility makes aligning the accuracy of task execution challenging and increases the risk of product failure.

In some cases, a robot's task execution may be inaccurate due to environmental factors, such as unfinished products, raw material condition, and other robots in the collaboration team. Further, the robot itself can be impacted by machine tool wear, overheating, actuator misalignment, and the like. The accuracy of each individual robot generally cannot be obtained by straightforward inspection or measurements, since the regret caused by inaccurate actions propagates due to measurement noise and can accumulate along a production flow, which leads to partial observability. Consequently, the resilience of an MRS in a smart factory is challenged by external dynamics of variant production demands, internal dynamics of frequent reconfiguration and collaboration with varying robot teams, and partial observability due to absence of precise global references for aligned task execution in flow-based manufacture. As mentioned above, a robot's regret may also drift due to misalignment of sensors and machine tools, machine tool wear etc., which is a predictive maintenance problem that challenges resilience in MRSs. Point failures may happen when a small number of robots have significant misalignment problems within their collaborative robot team and dedicated cyberattack on wireless networks and robot applications can introduce wireless outage and abrupt inaccuracies.

To address these and other limitations with existing MRS techniques and architectures, a system and methods for controlling robots in an MRS are generally described herein. In at least one aspect, a partially connected, wireless social network is described that does not require frequent topology switching. Notably, social learning in MRSs and MASs, with distributed diffusion strategy, may result in accelerated and/or higher efficiency learning, as messages may be passed to multiple robots (but not all robots) and each robot may be configured to adapt to social evidence and perform estimation simultaneously. In addition, said social learning can enable scalable wireless communication that considers an MRSs spatial layout and allows for adaptations to production flow changes without frequently switching social network topology. With respect to faults, individual robots can make soft opinion decisions while hard maintenance decisions are made on a more robust edge server or other computing device through consensus. In distributed social learning, external and internal dynamics and/or partial observability can be assumed, such that each robot may only communicate with a small subset robots of the MRS.

In some aspects, the system and methods described herein may be realized via a systematic social multi-robot AI network, which can implement and/or include: i) Bayesian network-based social learning to estimate system action regret state, ii) a stochastic gradient descent (SGD) network to track system regret drift state, and iii) distributed soft trust decision and centralized maintenance decision to detect failure robots caused by drifting or cyberattacks. In addition, the system and methods described herein can include: i) stochastic unified degree social network topology formulation, ii) hierarchical reinforcement learning-based distributed alignment action decision, and iii) rule of thumb for social network composite degree.

In some aspects, the system and methods described herein provide a systematic methodology for resilient MRS in smart factories with stochastic social network formulation, Bayesian network social learning, SGD for state tracking, computationally-cheap reinforcement learning (RL) based action alignment, and consensus maintenance decision-making. Each robot in the MRS may execute and/or include a uniform, cascade machine learning network. In some implementations, the machine learning network of each robot is trained to have different weights. Compared to traditional artificial neural networks (ANNs), the cascade machine learning network described herein manually assigns connection and connection weights—making the output nonlinear to the input—and doesn't require back propagation. Although some of the elements in the modeling consider linear dynamics, the entire system—under the architecture of MRTA orchestration, stochastic social network, individual RL-based action—is highly nonlinear. Additionally, a SGD supervised by Bayesian social learning generally does not require significant computational costs and/or pre-collected data for offline training.

Overview

Referring now to FIG. 1A, a diagram of an example hybrid MRS 100 is shown, according to some implementations. MRS 100 is, in particular, shown to include a plurality of robots 102. In some implementations, robots 102 are industrial robots used for manufacturing. For example, each of robots 102 may be configured to perform a task in a manufacturing and/or fabrication process. MRS 100 can also include various additional robots 104 that perform tasks related or unrelated to the manufacturing and/or fabrication process performed by robots 102. In FIG. 1, for example, MRS 100 includes a plurality of mobile robots that can move around a factory or manufacturing facility (e.g., to transport materials, components, and the like between robots 102).

While generally described herein as industrial robots and/or robots used for manufacturing and/or in factories, it should be appreciated that robots 102, 104 may be any type of robot or autonomous device. For example, in some implementations, robots 102, 104 may be vehicles with autonomous capabilities.

Generally, each of robots 102, 104 can include a controller or other computing hardware that facilitates operation of each respective robot as an artificial intelligence (AI) agent, as described below in greater detail with respect to FIG. 7. In some implementations, robots 102 and/or robots 104 can communicate with (e.g., transfer data to and/or receive data from) a remote computing device, shown as an edge server 108. In some implementations, edge server 108 is configured to receive operational data, configuration data, and other information from robots 102, 104, and can additionally or alternatively send configuration data, maintenance instructions, scheduling information, and other operational data to each of robots 102, 104. For example, edge server 108 may send instructions to each of robots 102 to configure each robot for a respective task in a fabrication process. In some implementations, communications between robots 102, 104 and edge server 108 are facilitated by (e.g., run through) a router or modem 106. In some such implementations, robots 102, 104 can communicate wirelessly with edge server 108. In various implementations, robots 102, 104 can communicate directly with edge server 108 (e.g., via a wired or wireless connection) or indirectly. For example, in some implementations, robots 102, 104 can communicate with edge server 108 via a network (e.g., a local area network (LAN), the Internet, etc.).

Figure 1B:
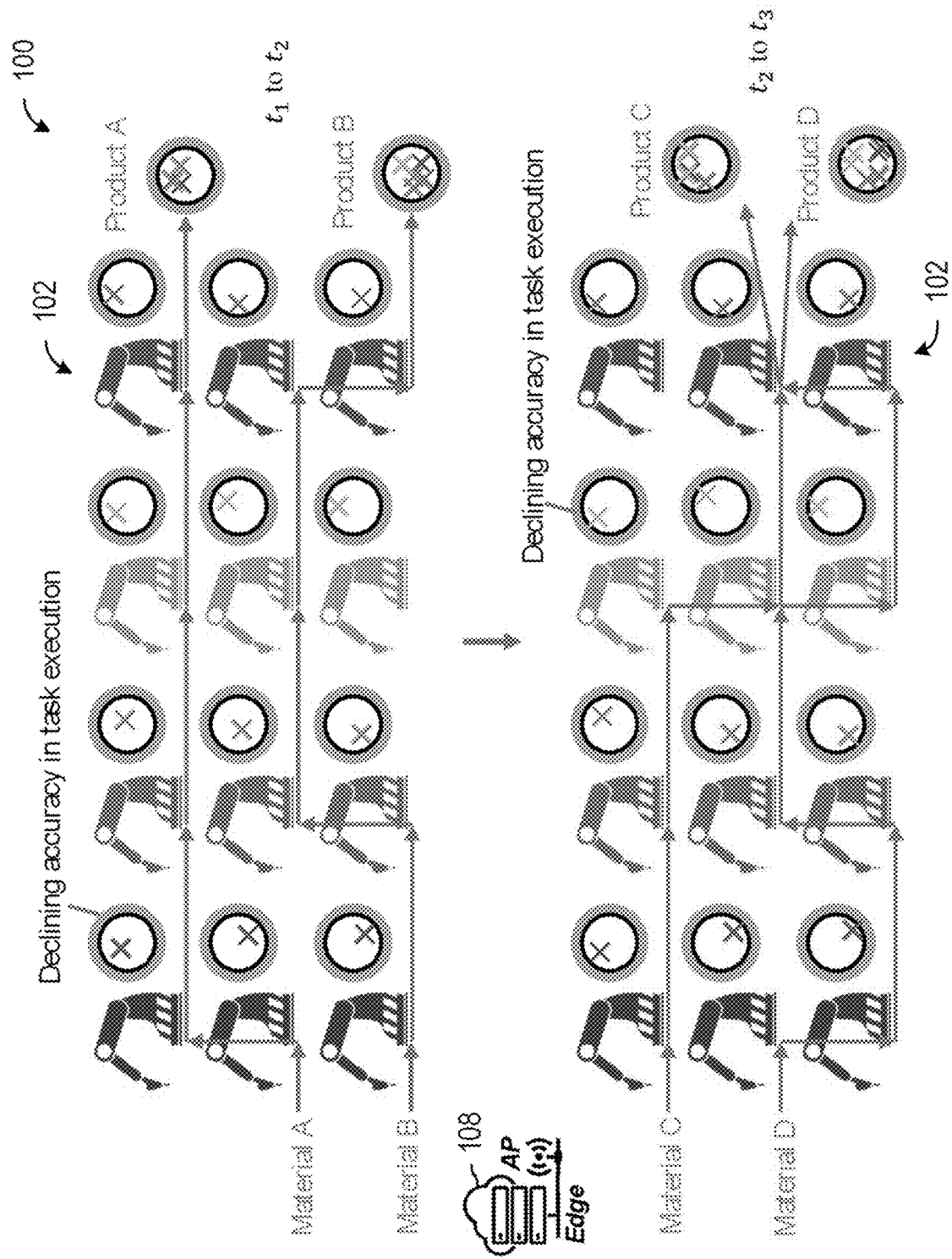

FIG. 1B illustrates MRS 100 of FIG. 1A adapted for two different production flows between different time steps. As shown in the top half of FIG. 1B, MRS 100 is in a first configuration where a 'Material A' and a 'Material B' are used to produce corresponding products, 'Product A' and 'Product B'. Each of the materials is shown to flow a different path through robots 102, thereby each being modified in a different manner by each of robots 102. FIG. 1B also visually indicates an example accuracy of each robot. In some implementations, the accuracy of each of robots 102 affects the quality of the respective completed product. As such, inaccuracies in robots 102 can be compounded, possibly resulting in a substandard or insufficient end product.

After time step $t_2$, MRS 100 is shown to change configurations to produce 'Product C' and 'Product D' from 'Material C' and 'Material D'. In some implementations, edge server 108 initiates this change in configuration by assigning new tasks to each of robots 102 in mal-time or near real-time, thereby modifying a production flow through MRS 100. It can also be seen from FIG. 1B that the accuracy of each of the robots 102 has drifted slightly between time steps. As discussed in greater detail below, robot accuracy can drift for a number of reasons, such as wear on the robot itself, changes in material quality, and the like. In some implementations, robot accuracy is a tracked variable that is assumed to drift/decline over time. In some such implementations, once a robot's accuracy exceeds a threshold limit, the robot may be flagged for maintenance and/or maintenance may be automatically scheduled for the robot.

Physical Network

Figure 2:
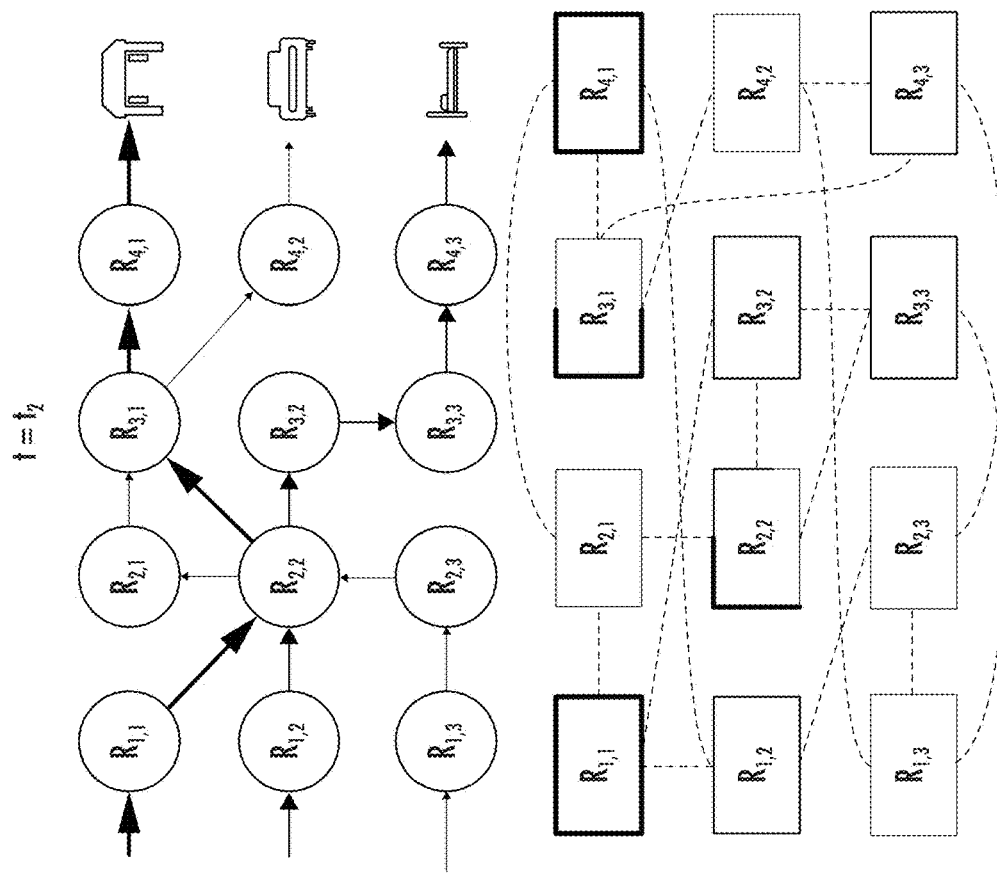
FIG. 2 is a diagram of a cyber-social MRS network, according to some implementations.
Figure 2:
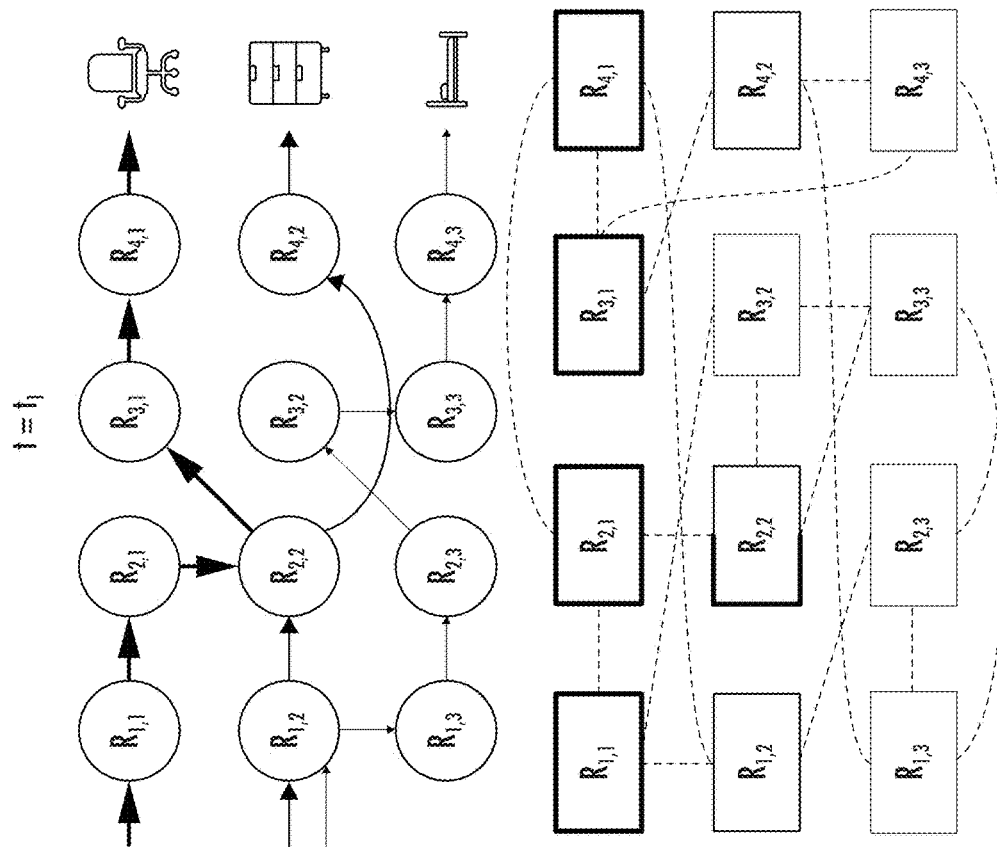

Referring now to FIG. 2, a diagram of an example cyber-social MRS network is shown, according to some implementations. Generally, MRSs (e.g., in smart factories) can be envisioned as a dual-layer network having both a physical layer and cyber layer. These two layers share robots as vertices but are different in topologies, as illustrated in FIG. 2.

In some implementations, a synchronized, heterogeneous, wireless networked multi-robot system (e.g., MRS 100) can be characterized by tuple (M, N, ω, $\epsilon_h$, $\epsilon_v$, $\epsilon_d$). {N}= $(N_1, \ldots, N_m, \ldots, N_M)$ indicates that $N_m$ type-m production robots are spatially placed and top-aligned in the $m^{th}$ column dedicated to type-m manufacturing tasks, m=1, ..., M. Synchronization occurs with respect to timeslot t, in which each robot column has multiplexing capability $\omega_m$ from $\omega=(\omega_1, \ldots, \omega_m, \ldots, \omega_M)$. This means that type-m production robots are capable of executing $\omega_m$ type-m tasks in parallel in a given timeslot. Transportation is generally restricted between two spatially-adjacent production robot neighbors in columns, rows, or diagonally, with fixed transportation energy $\epsilon_h$, $\epsilon_v$, $\epsilon_d$ respectively.

Hence, the physical network at timeslot t, $G_{phy}^t(\{R_{m,n}\}, E_{phy}^t)$ inherits production robot set $\{R_{m,n}\}$ as vertices, characterized by tuple (m, n, $\omega_m$, $TA_{m,n}^t$). Driven by a hyper-graphical MRTA, the task assignment ($TA_{m,n}^t$) effective at timeslot t can be derived from a set of production flows $\{\rho^{l,t}\}$ in the form of simple path in hypergraph given by (1a), in which $l \in L^t$ fulfills the production demand $L^t$. This also provides the edges of $G^t$, e.g., a transportation path given by (1b), for all $l \in L^t$.

$$\rho^{l,t} = (R_{m_1,n_1}^l, R_{m_2,n_2}^l, \ldots, R_{m_l,n_l}^l) \tag{1a}$$

$$E_{phy}^t = \{(R_{m_1,n_1}^l, R_{m_2,n_2}^l), \ldots, (R_{m_{l-1},n_{l-1}}^l)\} \tag{1b}$$

In some cases, pluralism can occur when one robot is included or participates in multiple production flows, which suggests that it collaborates with multiple teams of robots. The top half of FIG. 2 shows two physical networks in which reconfiguration take place in between time intervals $t_1$ and $t_2$. Reconfiguration, as referred to herein, generally refers to physical topology changes in the MRS. FIG. 2 further illustrates a product-type corresponding production flow between robots, where arrows indicate task assignments, transportation path, as well as straightforward productivity and energy efficiency evaluation. In the example of FIG. 2, pluralism can occur to $R_{1,2}$ and $R_{2,2}$ at $t=t_1$, and $R_{2,2}$ and $R_{3,1}$ at $t=t_2$. Reconfigurability, multiplexing, and pluralism can enable flexible manufacturing while challenge productivity and energy efficiency optimization, which is resolved by real-time MRTA.

Cyber (Social) Network

Consistent with partial observability and absence of a global reference, the cyber network described herein, denoted as $G_{cyb}$, is generally a partially connected social network that shares hypervertex set $\{R_{m,n}\}$ with the physical network, $G_{phy}$. As shown, $G_{phy}$ generally includes wireless Robot-to-Infrastructure-to-Robot (R2I2R) communications. As briefly discussed above, a fully connected topology may not be a suitable communication architecture for MRSs, since each robot in an MRS can collaborate within a small team. Therefore, redundant communications can increase message passing between robots, introducing delays and making the system sensitive to wireless outage and cyber-attacks. In contrast, a partially connected, unify-degree social network can work well with the wireless communication and resources usage on robots and is scalable.

The topology control of a social network can be generally viewed as a network sampling or representation problem that benefits robustness and resilience in MRSs by using a limited amount of wireless communication and robot computing resources. Algorithm 1, below, includes a unify-degree hypergraph sampling algorithm which outputs a stochastic social network topology. In some implementations, this stochastic social network topology is implemented by edge server 108 or another computing device. Algorithm 1 iteratively considers each robot hypervertex, $R_{m,n}$, as the root, taking robot-type differences with root hypervertex as the depth of the search tree, and obtaining d social neighbors of the root vertex from a random walk. k is a ratio of the number intra-type hypervertices over the inter-type hypervertex in the social network. The social network degree is thus a composite: degree$_{cyb}$=(d, kd, (1−k)d). This suggests that cyber network $G_{cyb}$ has degree of d, and that each hypervertex has kd links to intra-type hypervertices and (1−k)d links to inter-type hypervertices.

| Algorithm 1: Stochastic Social Network Formulation |
|---|
| Data: $G_{phy}(\{R_{m,n}\}, E_{phy})$, degree$_{cyb}$ = (d, kd, (1 − k)d) |
| 1  Initialization: |
| 2  $G_{cyb}(\{R_{m,n}\}, E_{cyb}) \leftarrow G_{phy}$ |
| 3  $\{R_{m,n}$..Social-Neighbor$\} \leftarrow \emptyset$ |
| 4  for $R_{m,n}$ in $\{R_{m,n}\}$ : |
| 5  \|   $G_{tree} \leftarrow R_{m,n}. G_{phy}$ |
| 6  \|   while $R_{m,n}$..Social-Neighbor < d : |
| 7  \|   \|   if $R_{m,n}$..Social-Neighbor same-type < kd : |
| 8  \|   \|   \|   Candidates $\leftarrow \{R_{m\pm1,1}, \ldots, R_{m\pm1,N_m}\}$ |
| 9  \|   \|   \|   $R_{m,n}$.Social-Neighbor.same-type $\leftarrow$ |
| 10 \|   \|   \|   RandomChoose (Candidates) |
| 11 \|   \|   else: |
| 12 \|   \|   \|   Candidates $\leftarrow \{R_{m,n}\} \setminus R_{m\pm1,1}, \ldots, R_{m\pm1,N_m}$ |
| 13 \|   \|   \|   $R_{m,n}$.Social-Neighbor.different-type $\leftarrow$ |
| 14 \|   \|   \|   RandomChoose (Candidates) |

Consequently, a small set of fully connected robots (e.g., in two "hops") can form a social community. In some implementations, each social community of robots in an MRS periodically multi-cast both local evidence and social evidence—without retransmission and back/forth with the community. Meanwhile, a robot can be included in multiple communities so that evidence can be shared among the communities. All robots in an MRS, based on the above social-physical network model, can communicate with a smart agent on a remote device (e.g., edge server 108) through R2I communication. In this manner, robots can receive task assignments and maintenance instructions.

The bottom half of FIG. 2 shows two social networks, where reconfiguration takes place in between time intervals $t_1$ and $t_2$ (e.g., with degree (3, 0.33, 0.66)). In this example, the edge of each vertex shows a relationship within the physical network. The stochastic social network diffuses information through multi-casting and forwarding. In some implementations, an exception can occur if Line 7 of Algorithm 1 cannot be fulfilled. Considering the example shown in FIG. 2, Algorithm 1 can set a total link number d at first priority, enabling $R_{1,3}$ to have three inter-type links. The randomness of the stochastic social network is produced from the sequence of robots in Line 4 and function 'RandomChoose' in Line 10 and 14, which randomly choose a robot to link from a candidate list.

Cyber-Physical Interaction

As mentioned, collaboration among a heterogeneous MRS includes cyber-physical interactions that challenge the resilience of smart factories. Consider an example where, at timeslot t, a robot $R_{m,n}$ receives a piece of raw material or unfinished product 1 from upstream physical neighbor. The physical circumstance of the product can be characterized by product state $\theta^{l,t} \in \Theta$, where $\Theta$ is a product state space including all possible product states that the product could belong to. Robot $R_{m,n}$ may make measurements of the product to obtain numerical local evidence $x^{l,t}$ of product 1 in the cyber domain. Considering noise that may interfere with the measurements, let $x^{l,t}$ to be a random variable distinguish by function $fx|(\theta_{m,n}^{l,t})$ in (2).

$$x_{m,n}^{l,t} = f_X(\theta_{m,n}^{l,t}) := Pr(x = x_{m,n}^{l,t} | \theta_{m,n}^{l,t})$$

$$a_{m,n}^{t} = f_A(x_{m,n}^{l,t}) := Pr(a = a_{m,n}^{t} | x_{m,n}^{l,t})$$

$$\theta_{m',n'}^{l,t+1} = f_P(a_{m,n}^{t}, x_{m,n}^{l,t}, e_{m,n}^{t}) := Pr(\theta = \theta_{m',n'}^{l,t+1} | a_{m,n}^{t}, x_{m,n}^{l,t}, e_{m,n}^{t}) \quad (2)$$

After the measurement, $R_{m,n}$ can make decisions about task execution based on $x_{m,n}^{l,t}$, denoted by action $a_{m,n}^{l,t} \in \mathcal{A}$, where $\mathcal{A}$ is an action space that reflects a range that robot can possibly modify the state of the product (characterized by function $f_A(x^{l,t})$ in (2)). Cyber regret is simply indicated by the action decision $a^{l,t}$ with $a^{l,t}=0$, as a straightforward action that modifies product 1 as configured. During this process, a robot can have an unknown physical regret denoted by numerical time series variable $e_{m,n}^{t}$, which describes the accuracy of robot $R_{m,n}$. Meanwhile, positive numerical $\gamma_R$ denotes a maintenance threshold such that $-\gamma_R \leq e_{m,n}^{t} \leq \gamma_R$ indicates that $R_{m,n}$ is in normal operation; otherwise, $R_{m,n}$ may be flagged as faulty or in need of maintenance.

Each robot in an MRS can generally be thought of as a repairable unit. This introduces Time to Repair (TTR) and Mean Time To Repair (MTTR) to model action regret drifting and maintenance. Specifically, the drifting of action regret is characterized by $w_{m,n}$ for $R_{m,n}$. Herein, it is assumed that drift is a linear process, given by (3a) in which $e^0$ is the action regret of $R_{m,n}$ at initial timeslot $t_0$. Additionally, $TTR_{m,n}$ is the number of timeslots that $R_{m,n}$ has significant regret ($e_{m,n}^{t} \notin [-\gamma_R, \gamma_R]$) since last maintenance as in (3b). When maintenance is complete, $e_{m,n}^{t}$ can generally be reset. MTTR the expected value of all robot's TTR, a system-wise variable indicating robustness and resilience.

$$e_{m,n}^{t} = w_{m,n}\begin{pmatrix} t \\ e_{m,n}^{0} \end{pmatrix} \quad (3a)$$

$$w_{m,n}\begin{pmatrix} TTR_{m,n} + t_{last\ maintenance} \\ 0 \end{pmatrix} = -\gamma_R \text{ or } \gamma_R \quad (3b)$$

The process of product by $R_{m,n}$ is therefore characterized by function $f_P(a_{m,n}^{t}, x_{m,n}^{l,t}, e_{m,n}^{t})$ in (2).

Figure 3:
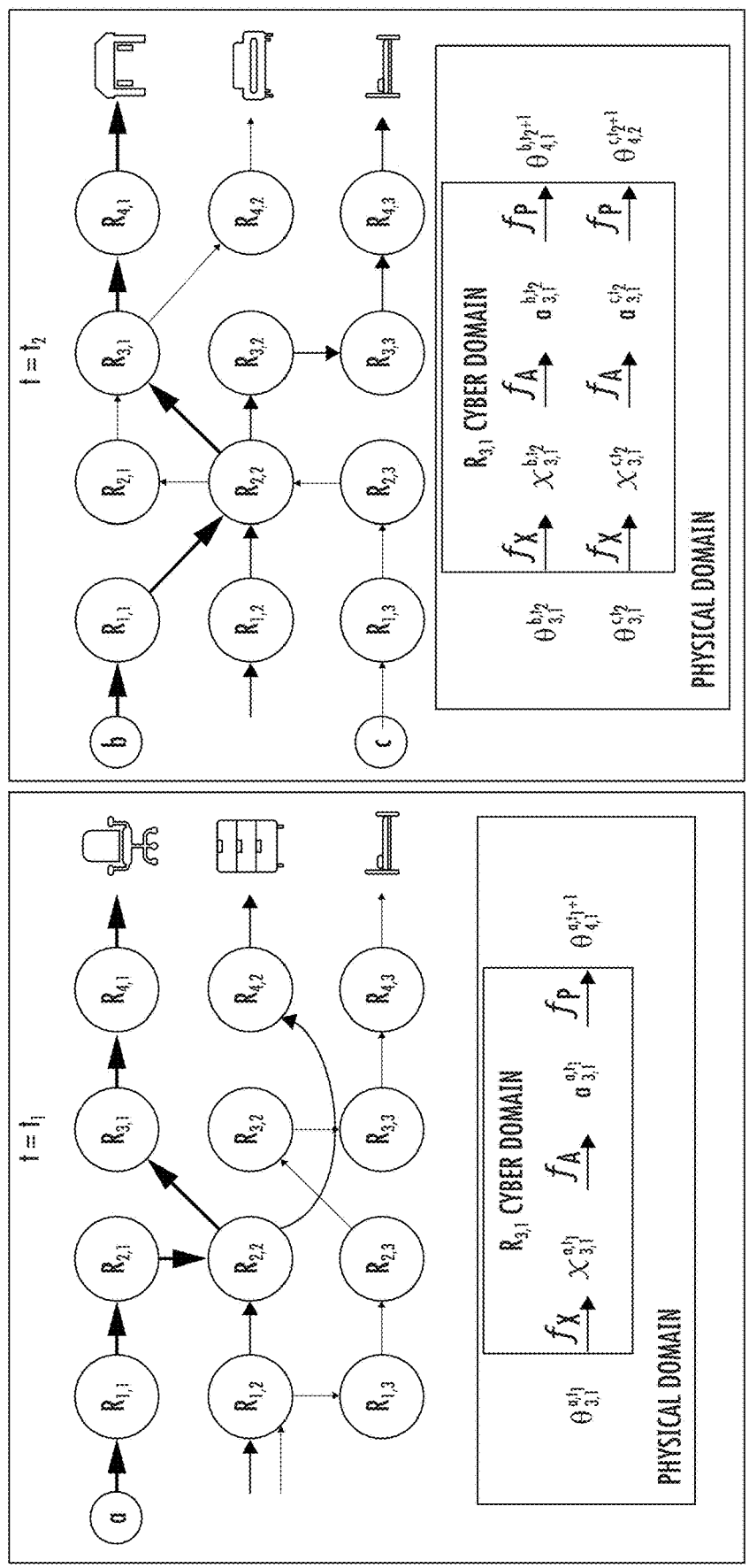
FIG. 3 is a diagram of cyber-physical interactions over a dynamic physical network, according to some implementations.

Referring now to FIG. 3, a diagram of cyber-physical interactions over a dynamic physical network is shown, according to some implementations. In particular, FIG. 3 shows cyber-physical interactions over two physical networks in which reconfiguration takes place between time interval $t_1$ and $t_2$. In the lower portions of FIG. 3, $R_{3,1}$ is used to illustrate cyber-physical interactions. Product physical state $\theta^{l,t}$ is part of the environment for $R_{3,1}$ and $x^{l,t}$ that gives robot a local cyber abstraction of product physical state and to take action $a^{l,t}$. In this example, task reconfiguration has occurred between $t_1$ and $t_2$ such that $R_{3,1}$'s task assignment has changed from "manufacture product-a" to "manufacture product-b and c." Meanwhile, physical network changes cause $R_{3,1}$'s physical neighbors to change from ($R_{2,2}$, $R_{4,1}$) to ($R_{2,1}$, $R_{2,2}$, $R_{4,1}$, $R_{4,2}$), which shows how social learning can take advantage of external dynamics to collect and diffuse information about a system over time.

In an MRS, each robot (e.g., robots 102) is a complex individual system involving a joint effort of AI control and sensing and analysis, operating with an absence of precise global reference of actions (known as the robot-pose problem). In a heterogeneous MRS with dynamic production flow and time variant collaborative robot teams, the productivity and efficiency goal of smart factories are imperiled by internal and external dynamics, which lead to a robustness and resilience operation problem. As discussed above, a product l manufactured by an MRS has production flow (1a) and thus the state of product l, having been modified by i robots, can be denoted by action vector $a^1$ as in (4).

$$a^1 = (a_{m_1,n_1}^{l,t}, a_{m_2,n_2}^{l,t+1}, \ldots, a_{m_i,n_i}^{l,t+i-1}) \quad (4)$$

By assuming real-valued actions, and that modification of the product state is linear, the degree of alignment of actions can be evaluated as a standard deviation of all the actions in the action vector. This is denoted by $\Phi$ in (5a), in which $$\bar{a} = \frac{1}{i} \sum_{j=1}^{i} a_{m_j,n_j}^{l,t+j-1},$$

given task assignments $\{\rho^l\}$ for all $l \in \mathcal{L}$. Smaller $\varphi^l$ values indicate a better degree of alignment during manufacturing, and thus the finished products tend to be of a higher quality. Another practical smart factory performance index is Yield, which defines a percentage of satisfactory products within a given accuracy. For the purposes of this disclosure, Yield may be constrained by $\Delta$—that is, only if the difference between the maximum action value and minimum action value is less than $\Delta$ will the product be counted into Yield, where function max and min returns maximum element and minimum element of the input vector and $1_\Delta$ is an indicator function. Greater yield directly suggests greater productivity and efficiency of a smart factory.

$$\Phi = \frac{1}{\|\mathcal{L}\|} \sum_{l \in \mathcal{L}} \varphi^l, \varphi^l = \sqrt{\frac{1}{i-1} \sum_{j=1}^{i} \left(a_{m_j,n_j}^{l,t+j-1} - \bar{a}\right)} \quad (5a)$$

$$Y \sum_{l \in \mathcal{L}} 1, 1_\Delta : \{\max(a^1) - \min(a^1)\} \rightarrow 0, 1 \quad (5b)$$

Although a series of inaccurate task executions by a plurality of robots can still generally fulfill a fabrication process, misalignment may lead to failure/rejection of finished products. Dynamic production flows and robot pluralism make it challenging to improve robot action alignment without specific knowledge of action regret of each robot in a collaboration team (e.g., a community). Additionally, since each robot is configured to execute the assigned tasks, sensors in the environment (including other robots in MRS that the robot collaborating with) are generally used collect information about accuracy rather than relying on the robot itself to take measurements (e.g., as the robot may be misaligned or otherwise not performing properly, which can propagate errors into the measurements). More importantly, a temporal production flow endures accumulation of inaccurate task executions since robots execute task based on measurements of a product state. Therefore, cyber-physical interactions are often not enough to estimate the action regret of physical neighbors. Point failure may happen as a robot's action regret drifts over time, or when a significant and/or abrupt regret value appear in the MRS due to lack of maintenance or dedicated cyberattacks.

The resilience of MRS driven flow-based manufacturing can therefore be evaluated by preserving the average product quality factor $\Phi$ and Yield by adapting stochastic and abrupt disturbance from both inside and outside the system. The above discussion leads to the social learning posed below, on top of cyber-physical interaction. The resilience problem thus involves distributed state estimation, distributed coordination, and distributed action decision-making with concrete numerical performance index seeking for the alignment of robot actions within the collaboration team.

Distributed Machine Learning Over a Social Network

Figure 4A:
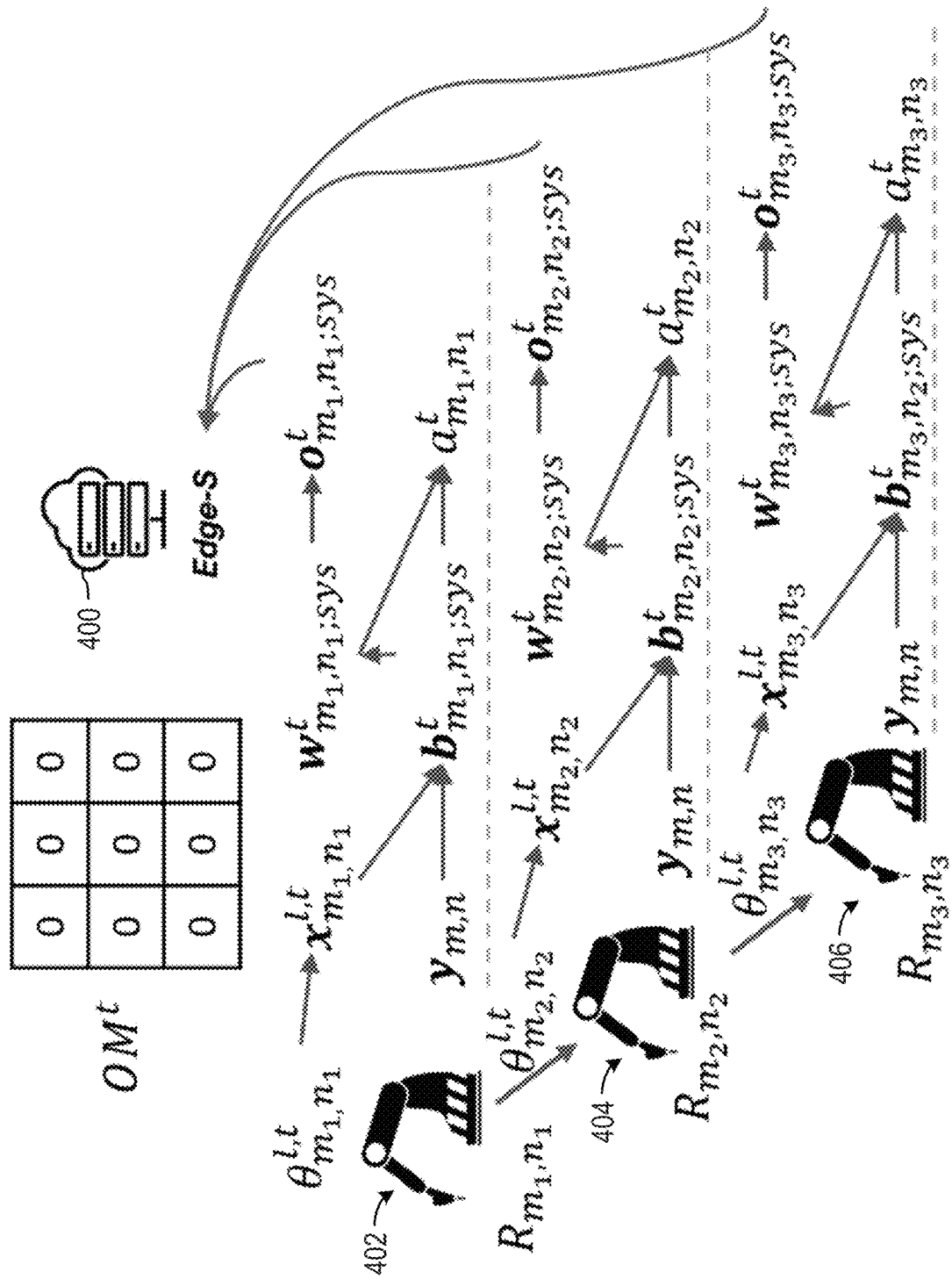
FIGS. 4A and 4B are diagrams of an example social-physical network, according to some implementations.
Figure 4B:
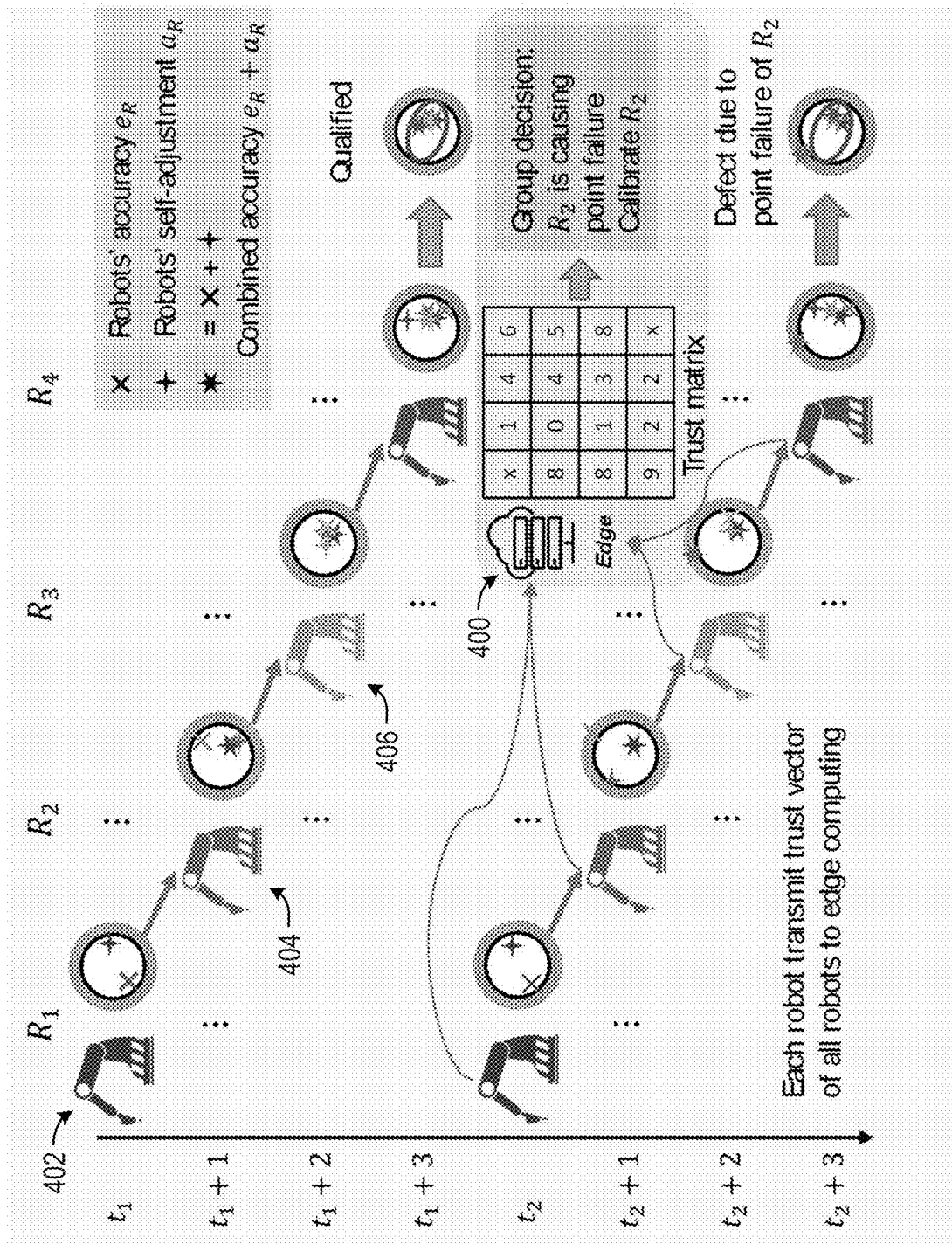

Referring now to FIGS. 4A and 4B, diagrams of an example social-physical network are shown, according to some implementations. In this example network, a plurality of production robots 402-406 are shown to communicate with an edge server 400, or another remote device. As discussed above, an MRS is a distributed machine learning system over social network with uniform learning model, learning objectives, and training algorithms. FIG. 4B, in particular, illustrates a production flow across robots 402-406. In particular, at time $t_1$, robot 402 may take action on a material or component that is being fabricated/produced, which is then passed to and acted upon by robot 404 at time $t_1+1$, and so on. In this case, a robot may "take action" by executing its designated action as part of the production process. For example, a robot may cut, weld, bend, or take any other action to manipulate the material/component.

Each robot is also shown to have a designated accuracy, $e_R$, and can apply self-adjustments, $a_R$, to correct or offset any inaccuracies (e.g., to compensate for wear, material differences, etc.). As mentioned above, robot accuracies and/or self-adjustments—which can also be indicated as combined $e_R+a_R$—can compound throughout the production flow, which ultimately determines the quality of the output product. As discussed in greater detail below, each robot may also be configured to generate a trust opinion vector, which indicates a level of trust to each of the other robots in the MRS. For example, robot 408 can generate a trust opinion vector indicating trust in each of robots 402-406. These trust opinion vectors may be transmitted to edge server 400 or another remote device and aggregated into a trust matrix. From the trust matrix, edge server 400 can detect failures, inaccuracies, and/or errors. In this example, edge server 400 can determine, from the trust opinion vectors received from each of robots 402-408, that robot 404 ('$R_2$') is causing a point failure, which is resulting in defects in the final product. Thus, edge server 400 may initiate corrective actions, such as forcing a calibration of robot 404, scheduling robot 404 for maintenance, or the like.

Building on the social-physical network and formal resilience definitions, above, the learning objectives are to: a) estimate system regret state $e_{sys}^t$ given by (6) as local belief $b_{m,n;sys}^t$ and estimate system drift state $w_{m,n;sys}^t$ given by (13) on top of $b_{m,n;sys}^t$; b) detect robots with significant regret and calculate system trust opinion $o_{m,n;sys}^t$ as a soft opinion; and c) adapt AI decision-making to improve function $f_A(x_{m,n})$ for aligned actions with collaboration team and further improve system $\Phi$ and Yield.

Meanwhile, a smart agent on edge server 108 or another remote device can gather trust opinions from individual robots, which are used to make a "hard" decision of maintenance—considering partial observability and the fact that maintenance has certain cost and may relegate productivity and efficiency.

$$e_{sys}^t = (e_{1,1}^t, \ldots, e_{m,n}^t, \ldots, e_{M,N_M}^t) \quad (6)$$

Regret State Estimation

Figure 5:
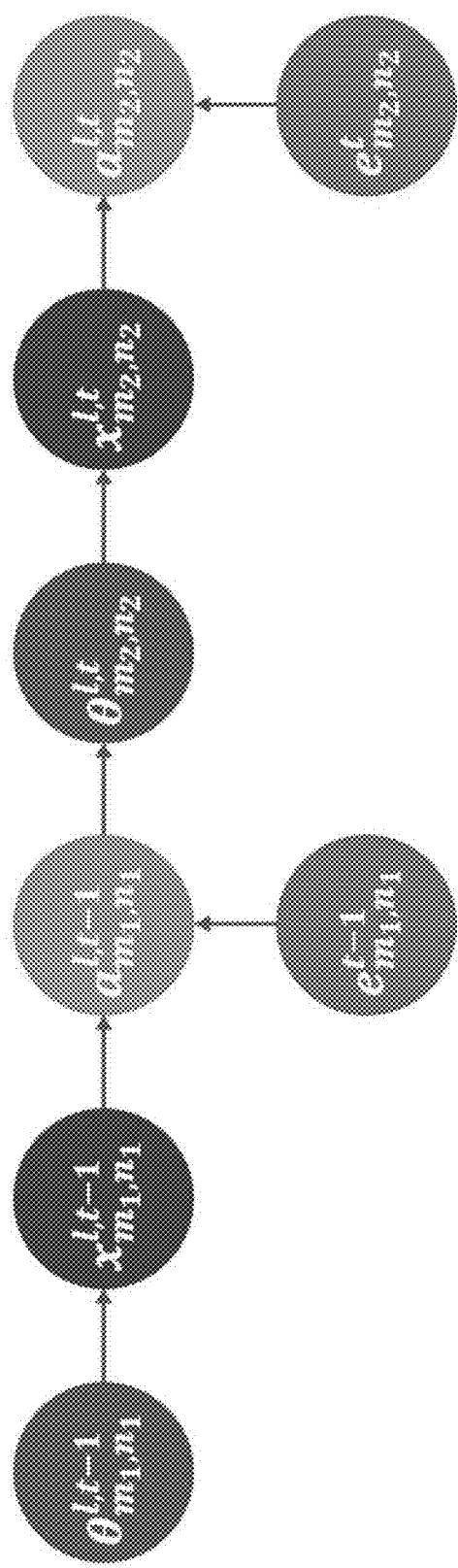
FIG. 5 is a diagram of an example Bayesian network for cyber-physical interactions, according to some implementations.

Due to the accumulation of inaccurate actions along the production flow and absence of a precise global reference, it may be insufficient to estimate any robot's action regret with local evidence from cyber-physical interactions. Accordingly, a social learning based state estimation is described herein, on top of multi-casting and/or forwarding wireless social communications in stochastic unify-degree social network discussed above. FIG. 5 shows an example Bayesian network that models a segment of a cyber-physical interaction on a production flow. The up-stream robot $R_{m_1,n_1}$ finishes process, then downstream robot $R_{m_2,n_2}$ receives the unfinished product and takes measurement $x_{m_2,n_2}^{t+1}$. The probability that $R_{m_2,n_2}$ obtains local evidence $x_{m_2,n_2}$ is given by (7).

$$Pr(x_{m_2,n_2}^{t,l}, \theta_{m_2,n_2}^{t,l}, a_{m_1,n_1}^{t-1,l}, x_{m_1,n_1}^{t-1,l}, \theta_{m_1,n_1}^{t-1,l}) = \tag{7}$$

$$Pr(x_{m_2,n_2}^{t,l} | \theta_{m_2,n_2}^{t,l}) Pr(\theta_{m_2,n_2}^{t,l} | a_{m_1,n_1}^{t-1,l}, x_{m_1,n_1}^{t-1,l}, e_{m_1,n_1}^{t-1,l})$$

$$Pr(a_{m_1,n_1}^{t-1,l} | x_{m_1,n_1}^{t-1,l}) Pr(x_{m_1,n_1}^{t-1,l} | \theta_{m_1,n_1}^{t-1,l}) Pr(\theta_{m_1,n_1}^{t-1,l}) =$$

$$f_X \theta_{m_2,n_2}^{t,l} f_P(a_{m_1,n_1}^{t-1,l}, x_{m_1,n_1}^{t-1,l}, e_{m_1,n_1}^{t-1,l}) f_A(x_{m_1,n_1}^{t-1,l}) f_X(\theta_{m_1,n_1}^{t-1,l}) Pr(\theta_{m_1,n_1}^{t-1,l})$$

where $f_P(\theta_{m_2,n_2}^{t,l} | a_{m_1,n_1}^{t-1,l}, x_{m_1,n_1}^{t-1,l}, \theta_{m_1,n_1}^{t-1,l})$ is the process by which $R_{m_1,n_1}$ takes action to modify a product, l, and $Pr(\theta_{m_1,n_1}^{t,l})$ is prior information about a physical state of product l.

The goal for $RR_{m_2,n_2}$ is to estimate $e_{m_1,n_1}^t$, while $R_{m_2,n_2}$ does not have data and/or values for $a_{m_1,n_1}^{t,l}$ and $x_{m_1,n_1}^{t,l}$. However, as discussed above, after socially communicating with $R_{m_1,n_1}$, $R_{m_2,n_2}$ may have social evidence of $x_{m_1,n_1}^{t,l}$ from its social community, denoted as $y_{m_1,n_1}^{t,l}$. Assuming that $y_{m_1,n_1}^{t,l}$ is available to $R_{m_2,n_2}$, a naïve-Bayes network can perform both updating the likelihood of $\mu_{m_1,n_1}^{t,l}(\varphi)$ and data aggregation of local and social evidences given by (8).

$$\mu_{m_1,n_1}^{t,l}(\varphi) = \frac{e_{m_1,m_1}^{t,l}(\varphi) f_X(\theta_{m_2,n_2}^{t,l}) f_P[a_{m_1,n_1}^{t-1}, y_{m_1,n_1}^{t-1,l}, e_{m_1,n_1}^{t,l}(\varphi)] f_A(y_{m_1,n_1}^{t-1,l})}{\sum_{\varphi' \in [-\gamma_R, \gamma_R]} e_{m_1,n_1}^{t,l}(\varphi') f_X(\theta_{m_2,n_2}^{t,l})} \tag{8}$$

$$f_P[a_{m_1,n_1}^{t-1}, y_{m_1,n_1}^{t-1,l}, e_{m_1,n_1}^{t,l}(\varphi')] f_A(y_{m_1,n_1}^{t-1,l})$$

Subsequently, a maximum likelihood estimation (MLE) can be made to form local belief $y_{m_1,n_1}^{t,l}$ about $y_{m_1,n_1}^{t,l}$ by summarizing (7), (8), and naïve-Bayes.

$$b_{m_1,n_1}^{t,l} = \text{argmax}_\varphi \log(\mu_{m_1,n_1}^{t,l}(\varphi) | x_{m_2,n_2}^{t,l}, y_{m_1,n_1}^{t-1,l}, a_{m_1,n_1}^{t-1}) \tag{9}$$

Without a loss of generality, $R_{m,n}$ can formulate a local belief of $R_{i,j}$, $b_{m,n;i,j}^t$ following a combine-then-adapt (CTA) diffusion strategy: local-social observation aggregation with Bayesian update in (10) and adaption with maximum likelihood estimation in (11), which is unique comparing to social learning methods that share beliefs instead of evidences. Both (10) and (11) use boldface vectors instead of time-specific values in (8) and (9), since social learning can be performed periodically or on-demand instead of being performed on every timeslot.

$$\mu_{m,n,i,j}^t(\varphi) = \frac{e_{i,j}^t(\varphi) f_X(\theta_{m,n}) f_P(a_{i,j}, y_{i,j}, e_{i,j}^t(\varphi)) f_A(y_{i,j})}{\sum_{\varphi' \in [-\gamma_R, \gamma_R]} e_{i,j}^t(\varphi') f_X(\theta_{m,n}) f_P(a_{i,j}, y_{i,j}, e_{i,j}^t(\varphi')) f_A(y_{i,j})} \tag{10}$$

$$b_{m,n;i,j}^t = \text{argmax}_\varphi \log(\mu_{m,n;i,j}^t(\varphi) | x_{m,n}, y_{i,j}, a_{i,j}) \tag{11}$$

Consequently, $R_{m,n}$, after social learning, will develop a local belief $b_{m,n;sys}^t$ of a system regret state $e_{sys}^t$ given by (12), which is the objective of social learning. Due to the social topology, wireless error, and non-retransmission in social communications, it's generally not feasible for each robot to have local belief of all other robots in the system. Consequently, $b_{m,n;sys}^t$ is a generally a partially observable regret state for an individual robot.

$$b_{m,n;sys}^t = \begin{pmatrix} b_{m,n;1,1} & \cdots & b_{m,n;m,1} & \cdots & b_{m,n;M,1} \\ b_{m,n;1,2} & \cdots & b_{m,n;m,2} & \cdots & b_{m,n;M,2} \\ \vdots & \ddots & \vdots & \ddots & \vdots \\ b_{m,n;1,N_1} & \cdots & b_{m,n;m,N_m} & \cdots & b_{m,n;M,N_M} \end{pmatrix} \tag{12}$$

Thus, both local evidence and social evidence, benefited from dynamics in physical network, can be enhanced over every reconfiguration of MRS, since each robot accumulates beliefs of additional robots in the MRS. Applying social learning takes advantage of the dynamics that challenge robustness and resilience to enhance the adaption ability of a distributed MRS.

Regret State Tracking

Under the modeling described above, the regret of production robots can generally be defined as time series data that reaches and/or moves to a maintenance threshold—defined as $[-\gamma_R, \gamma_R]$—over time. Regret state tracking can address regret drifting issues and can estimate a system drift state $w_{m,n;sys}^t$ from local belief $b_{m,n;sys}^t$. Since $b_{sys}^t$ relies on MRS task execution, cyber-physical interaction, and social learning, the estimation of $w_{m,n;sys}^t$ is an online process, e.g., a stochastic optimization problem. Stochastic gradient descent (SGD) is a general framework that calculates a stochastic gradient to approximate a gradient vector from streaming data. As in (3a), the drifting state can be modeled linearly. Thus, SGD on a production robot is used to estimate $w_{m,n;i,j}^t$ using streaming $b_{m,n;i,j}^t$ from social learning.

$$w_{m,n;sys}^t = \begin{pmatrix} w_{m,n;1,1} & \cdots & w_{m,n;m,1} & \cdots & w_{m,n;M,1} \\ w_{m,n;1,2} & \cdots & w_{m,n;m,2} & \cdots & w_{m,n;M,2} \\ \vdots & \ddots & \vdots & \ddots & \vdots \\ w_{m,n;1,N_1} & \cdots & w_{m,n;m,N_m} & \cdots & w_{m,n;M,N_M} \end{pmatrix} \tag{13}$$

Benefitting from the above-mentioned CTA diffusion strategy and social learning, a drifting model and SGD become a supervised learning methodology that helps to minimize temporal loss, supervised by local belief $b_{sys}^t$ from social learning.

$$\hat{b}_{m,n;i,j}^t = w_{m,n;i,j} \begin{pmatrix} t \\ b_{m,n;i,j}^0 \end{pmatrix} \tag{14}$$

Since social learning is based on noisy local evidence and social evidence, as well as partial observability, Huber loss with parameter $\delta$ given by (15) can adapted for more robust learning, since it is generally less sensitive to outliers in data than squared error loss.

$$J(\delta, b_{sys}^t, \hat{b}_{sys}^t) = \begin{cases} \frac{1}{2}(b_{sys}^t - \hat{b}_{sys}^t) & \text{for } |b_{sys}^t - \hat{b}_{sys}^t| \leq \delta \\ \delta(|b_{sys}^t - \hat{b}_{sys}^t| - \frac{1}{2}\delta) & \text{otherwise} \end{cases} \tag{15}$$

An MRS that implements SGD to estimate system drifting state $w_{m,n;sys}^t$ given by (13) is a fully distributed SGD system as in (16) with $\alpha$ as learning rate.

$$\begin{pmatrix} w^t_{1,1;sys} \\ \vdots \\ w^t_{m,n;sys} \\ \vdots \\ w^t_{M,N_M;sys} \end{pmatrix} = \begin{pmatrix} w^{t-1}_{1,1;sys} \\ \vdots \\ w^{t-1}_{m,n;sys} \\ \vdots \\ w^{t-1}_{M,N_M;sys} \end{pmatrix} - \begin{pmatrix} \alpha \nabla_w T \hat{J}_{1,1;sys} \\ \vdots \\ \alpha \nabla_w T \hat{J}_{m,n;sys} \\ \vdots \\ \alpha \nabla_w T \hat{J}_{M,N_M;sys} \end{pmatrix} \quad (16)$$

Similar to local belief $b_{m,n;sys}^t$, $w_{m,n;sys}^t$ in (13) is partially observable. A SGD algorithm with Huber loss is a computationally inexpensive and robust supervised learning method that enables resilience against the scenario that physical topology dynamics, wireless error, and wireless outages from cyberattacks invalidate social learning. For example, a robot can take the predicted belief in (14) as a local belief if social evidence is lost due to physical network dynamics and wireless outages.

Soft Trust Opinion

Due to partial observability, each individual robot has only partial exposure to a system's true state from the aforementioned cyber-physical interaction and social communications. Thus, fully distributed consensus decision making may not result in optimal decisions. A resilient, distributed MRS is an analogue of distributed fault-tolerant systems, in which trust-based methods are widely adopted in distributed fault tolerate systems. Herein, a trust-based soft opinion decision making methodology for detecting robots with significant regret is described.

Each robot, based on its local regret belief state $b_{m,n;sys}^t$ and local drift state estimation $w_{m,n;sys}^t$ can calculate, for a future timeslot $\tau$, when that robot may reach maintenance threshold $-\gamma_R$ or $\gamma_R$ from (17). Local opinion $o_{m,n;sys}^t$ is a vector with individual opinion values $o_{m,n;i,j=\tau_{i,j}}^t$ given by (18).

$$w^t_{m,n;i,j}\begin{pmatrix} t+\tau_{i,j} \\ b^t_{m,n;i,j} \end{pmatrix} = -\gamma_R \text{ or } \gamma_R \quad (17)$$

$$o^t_{m,n;sys} = (o^t_{m,n;1,1}, \ldots, o^t_{m,n;m,n}, \ldots, o^t_{m,n;M,N_M}) \quad (18)$$

Opinion vector $o_{m,n;sys}^t$ measures the level of trust of $R_{m,n}$ to other robots in the system. A larger $o_{m,n;i,j}^t$ value generally means that $R_{m,n}$ predicts that $R_{i,j}$ is more reliable and has less probability to challenge the resilience, while a smaller $o_{m,n;i,j}^t$ value can indicate that $R_{m,n}$ predicts that $R_{i,j}$ will become a robot with significant regret and should be considered for maintenance. An opinion vector is a soft decision, since no individual robot in a partially connected cyber network can have a precise and complete estimation of system regret state and system drift state—because, again, partial observability makes the opinion vector incomplete.

Action Decisions by Reinforcement Learning

Figure 6:
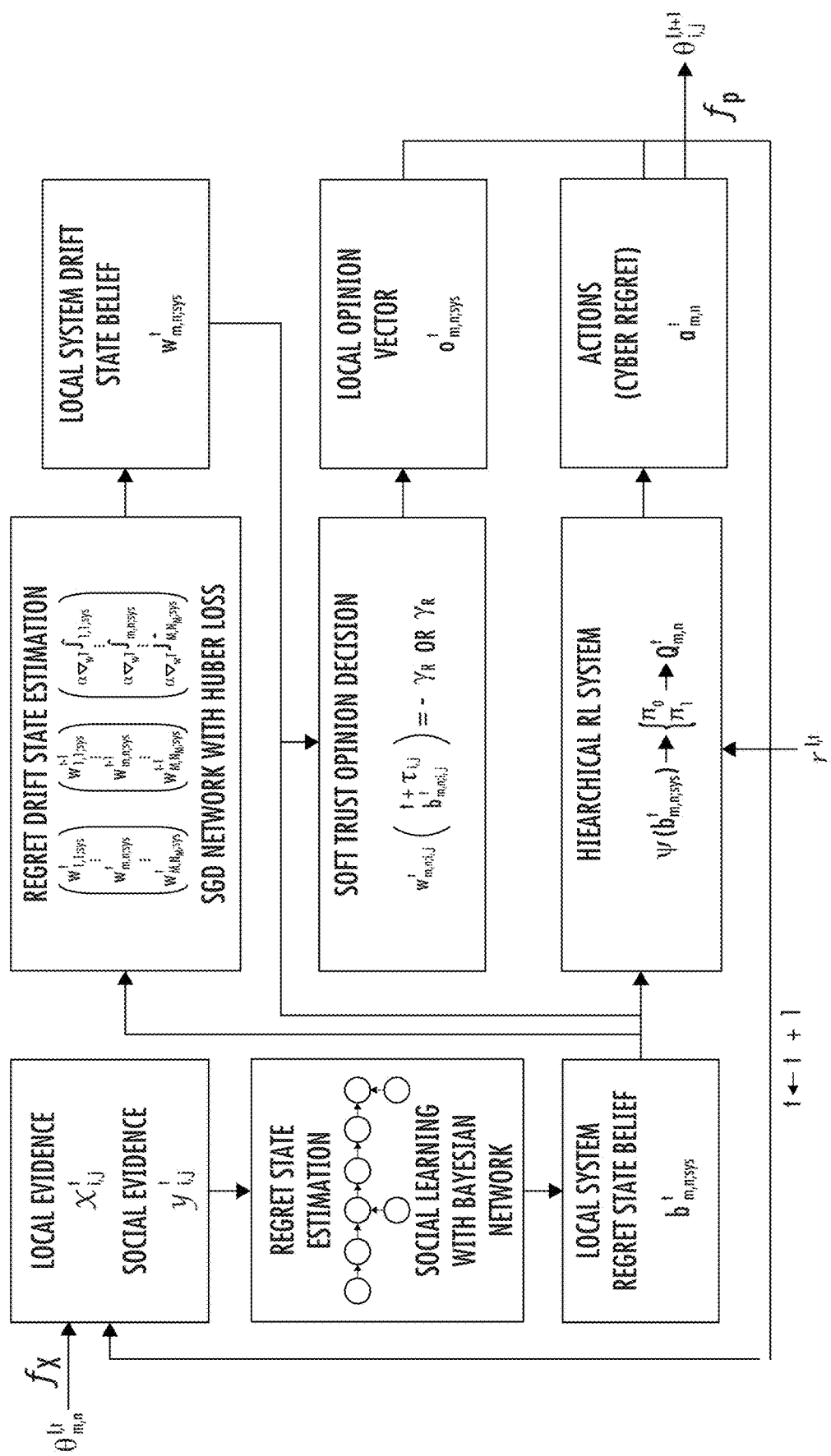
FIG. 6 is a diagram of a cascade machine learning network for MRSs, according to some implementations.

Referring now to FIG. 6 is a diagram of a cascade machine learning network for MRSs, according to some implementations. As mentioned above, noisy measurements, non-retransmission social communications, wireless error, wireless outages, and partial system state observability all challenge the resilience of an MRS. Accordingly, it may be desirable to implement additional reliable decision-making mechanisms to take actions with cyber regret so that actions in collaboration team can be aligned. To address this problem, a low complexity hierarchical reinforcement-learning (RL) based cyber action regret decision-making methodology is disclosed.

Hierarchical RL is generally characterized by tuple $(b_{m,n;sys}^t, a_{m,n}^t, r^{t,t}, \psi, \pi_0, \pi_1, \beta, \varepsilon)$ from the perspective of robot $R_{m,n}$. State $b_{m,n;sys}^t$ is a local system regret state belief at timeslot t. Action $a_{m,n}^t$ is an action decision for $R_{m,n}$ at timeslot t with $a_{m,n}^t \in \mathcal{A}$. $r^{t,t}$ is a reward provided by a remote system or device, such as an inspection system in a smart factory, which indicates a quality of the product l. State-action value function $Q_{m,n}^t(b_{m,n;sys}^t, a_{m,n}^t)$ is an optimization objective of the RL methodology and an accumulation of robot-environment interaction. Policies $\pi_0(b_{m,n;sys}^t, \varepsilon)$ and $\pi_1(b_{m,n;sys}^t, \varepsilon)$ are functions of a state that gives a probability distribution over actions. State classifier $\psi(b_{m,n;sys}^t)$ is a binary classifier that determines a policy to apply.

In some implementations, state classifier $\psi(b_{m,n;sys}^t)$ is a binary classifier that returns '0' when $R_{m,n}$ does not have local belief about itself ($b_{m,n;m,n}^t$) and '1' otherwise. When $\psi(b_{m,n;sys}^t)$ returns '0', $R_{m,n}$ may take actions following $\pi_0(b_{m,n;sys}^t, \varepsilon)$, which is to take actions that align to other robots in collaboration team since $R_{m,n}$ doesn't have regret information about itself. When $\psi(b_{m,n;sys}^t)$ returns '1', $R_{m,n}$ may take action following $\pi_1(b_{m,n;sys}^t, \varepsilon)$, which is to take actions to correct its physical regret through cyber regret while align to other robots in collaboration team. Both policies take e-greedy actions to balance exploitation and exploration.

A group of RL agents may interact with a non-stationary environment, including other robots and inspection systems, so that a learning rate $\beta$ plays the weight of history rewards when update date Q function in (19).

$$Q(b^t,a^t)=Q(b^t,a^t)+\beta[r^t+\eta\max_a Q(b^{t+1},a)-Q(b^t,a^t)] \quad (19)$$

Hierarchical RL can provide an updated temporal cyber-physical interaction framework on top of what is described above, as summarized by FIG. 6. In some implementations, an AI model is therefore implemented and/or executed on each robot in a MRS. In some implementations, the AI model includes a cascade machine learning algorithm with dedicated connections to improve desired productivity, robustness, and resiliency of an MRS. In some implementations, the AI model replaces $f_A$ from above, taking $x_t$ from the physical domain and $y_t$ from the cyber domain as inputs, and outputting at in the cyber domain. Algorithm 2, below, summarizes this machine learning process from the perspective of an individual robot, in which functions 'SocialLearning,' 'SGD,' and 'CalculateTrust' are correspond to the social learning, SGD, and opinion determinations/processes described above.

In the social learning step, a naïve-Bayesian update (10) utilizes $a_{i,j}$, which is not available from the diffusion strategy. In some implementations, $a_{i,j}$ can either be prior knowledge that is share amongst all of the robots in a system, or it can be distributed between robots along with the local and social evidences. For simplicity's sake, the earlier scenario is considered in the following use-case example, providing a four-step algorithm with the "step-size" numerical in Algorithm 2. At first step, the system performs cyber-physical interactions with $f_A$ and social communications, which can be referred as calibration period. Between the first step and the second step, each robot in the MRS performs social learning, SGD, and trust opinion decision making (e.g., as in lines 16-19 of Algorithm 2). In steps two through four, the MRS performs RL-based action-decision making while performing social communications. Therefore, learning is only performed periodically instead of in each timeslot, which further reduces the computation complexity of the AI network.

| Algorithm 2: Algorithm on robot $R_{m,n}$ |
| --- |
| Data: $G_{phy}$, $G_{cyb}$, $\gamma_R$, MTTF, $\Theta$, A, $\alpha$, $\beta$, $\Delta$, $\delta$, $\psi$, $\pi_0$, $\pi_1$, $\epsilon$, $f_X$, $f_A$, $f_P$, step-size |
| 1  Reconfiguration: |
| 2  physical-neighbors, Task-Assignment $\leftarrow G_{phy}$ |
| 3  social-neighbors $\leftarrow G_{cyb}$ |
| 4  other_robots $\leftarrow$ spatial_neighbor,m, n, M , N |
| 5  social_neighbor $\leftarrow$ spatial_neighbor, other_robots, k, p |
| 6  step-number = 0 |
| 7  learning-flag = 0 |
| 8  for t to Next reconfiguration do |
| 9      $x^t \leftarrow f_X(\theta^t)$ |
| 10     $y^t \leftarrow$ Social (social-neighbor, $x^t$, $y^{t-1}$) |
| 11     if step-mumber == 0 then |
| 12        $a^t \leftarrow f_A(x^t)$ |
| 13     end |
| 14     if step-number == 1 then |
| 15        if learning-flag == 0 then |
| 16            $b^t \leftarrow$ SocialLearning ($x^t$, $y^t$) |
| 17            $w^t \leftarrow$ SGD ($b^t$, $\alpha$, $\delta$) |
| 18            $o^t \leftarrow$ CalculateTrust ($b^t$, $w^t$, $\gamma_R$) |
| 19            learning-flag = 1 |
| 20        end |
| 21        $\alpha^t \leftarrow$ RL ($b^t$, $\alpha t-1$, $\psi$, $\pi_0$, $\pi_1$, $\beta$, $\epsilon$) |
| 22     end |
| 23     if step-number $\geq$ 2 then |
| 24        $\alpha^t \leftarrow$ RL ($b^t$, $\alpha^{t-1}$, $\psi$, $\pi_0$, $\pi_1$, $\beta$, $\epsilon$) |
| 25     end |
| 26     $\theta^{t+1} \leftarrow f_P(\alpha^t, x^t, e^t)$ |
| 27     if t % step-size == 0 then |
| 28        if step-number $\leq$ 3 then |
| 29            step-number += 1 |
| 30        else |
| 31            step-number = 0 |
| 32            learning-flag = 0 |
| 33        end |
| 34     end |
| 35  end |

Thus, a hierarchical RL methodology incorporates domain knowledge of social-physical network modeling to accelerate the convergence of Q function. Not only is offline training therefore optional, but resilience performance is improved when out-of-stochastic dynamics (e.g., abrupt disturbances) occur.

Consensus-Based Failure Detection and Maintenance

As discussed above, a hard maintenance decision is made on an edge server or other supervisory control system for the MRS, since fully distributed consensus may lead to poor decision making. Although maintenance can be modeled straightforwardly as a state change, it can also be assumed that maintenance can cause system-wide change at the cost of time, energy, etc. A smart agent on the edge server/supervisory controller, however, can determine both cyber and physical topologies of the system and is therefore in a more appropriate role to make hard decisions regarding maintenance and the like. Accordingly, described herein a trust consensus-based hard maintenance decision-making that can be implemented by the edge server and/or a supervisory controller.

In some implementations, a supervisory agent (e.g., operating on edge server 108 and/or another supervisory computing system) gathers opinion vectors from each agent (e.g., AI agents operating on each of the robots in the MRS) as opinion matrix $OM^t$ at timeslot t given by (20). Then, z robots with the least average trust will be regarded as robots with significant regret (e.g., failure robots) and will be selected by the supervisory agent for maintenance.

$$OM^t = \begin{pmatrix} o^t_{1,1;sys} \\ \vdots \\ o^t_{m,n;sys} \\ \vdots \\ o^t_{M,N_M;sys} \end{pmatrix} = \begin{pmatrix} o^t_{1,1;1,1} & \cdots & o^t_{1,1;m,n} & \cdots & o^t_{1,1;M,N_M} \\ \vdots & \ddots & \vdots & \ddots & \vdots \\ o^t_{m,n;1,1} & \cdots & o^t_{m,n;m,n} & \cdots & o^t_{m,n;M,N_M} \\ \vdots & \ddots & \vdots & \ddots & \vdots \\ o^t_{M,N_M;1,1} & \cdots & o^t_{M,N_M;m,n} & \cdots & o^t_{M,N_M;M,N_M} \end{pmatrix} \quad (20)$$

The performance of the decision is evaluated by autocorrelation of $OM^t$, given by (21a) and (21b).

$$CR^t = \begin{pmatrix} cr^t_{1,1;1,1} & \cdots & cr^t_{1,1;m,n} & \cdots & cr^t_{1,1;M,N_M} \\ \vdots & \ddots & \vdots & \ddots & \vdots \\ cr^t_{m,n;1,1} & \cdots & cr^t_{m,n;m,n} & \cdots & cr^t_{m,n;M,N_M} \\ \vdots & \ddots & \vdots & \ddots & \vdots \\ cr^t_{M,N_M;1,1} & \cdots & cr^t_{M,N_M;m,n} & \cdots & cr^t_{M,N_M;M,N_M} \end{pmatrix} \quad (21a)$$

$$cr^t_{m,n;i,j} = \frac{\text{Cov}(o_{m,n;sys}, o_{i,j;sys})}{\sigma_{m,n;sys}\sigma_{i,j;sys}} \quad (21b)$$

Consensus-based decision-making is also an information aggregation process for the supervisory agent. Compared to centralized methods, information aggregation can be initiated when a maintenance decision is necessary, such as when point failures are detected or when system-wide reconfiguration is initiated (e.g., triggered by new production demands). This can result in limited wireless communications and improved balance of computation between the edge server/supervisory computing system and each robot in the MRS, which is a benefit to resiliency of the system.

Figure 7:
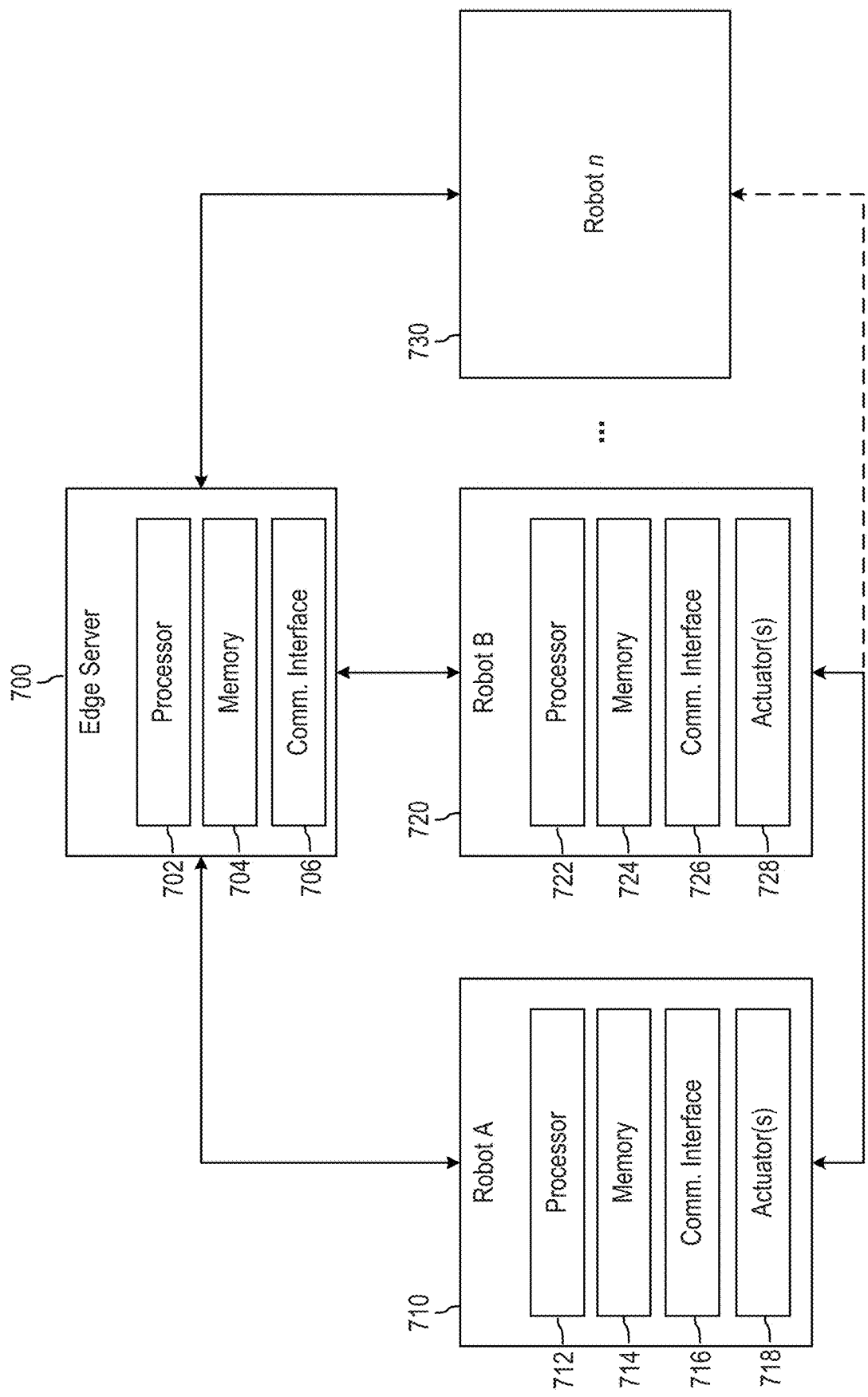
FIG. 7 is a block diagram of an example MRS have multiple individual robots that communicate with a remote device, according to some implementations.

Referring now to FIG. 7, a block diagram of an example MRS having multiple individual robots that communicate with a remote device is shown, according to some implementations. Specifically, the MRS is shown to include an edge server 700, which is generally the same as edge server 108 described above, and a plurality of robots 710, 720, and 730, which may be the same as robots 102, 104 also described above. It should be understood that the MRS may include any number of robots (e.g., n number of robots). In some implementations, the MRS is representative of an MRS that operates in a factory or other similar setting. In some such implementations, robots 710, 720, and 730 may be industrial robots that, together, fabricate or manufacture a product. It should be appreciated, however, that robots 710, 720, and 730 may be any robot device(s) that are configured to operate cooperatively. For example, robots 710, 720, and 730 may be autonomous or semi-autonomous vehicles, drones, etc.

Each of edge server 700, robot 710, and robot 720 are shown to include a processor and a memory, denoted as processors 702, 712, 722 and memory 704, 714, 724, respectively. While not shown, it should be appreciated that robot 730 and any other robots of the MRS may also include the same components as robots 710, 720. Processors 702, 712, 722 can be general-purpose processors, ASICs, one or more FPGAs, groups of processing components, or other suitable electronic processing structures. In some embodiments, processors 702, 712, 722 are configured to execute program code stored on respective memory 704, 714, 724 to cause edge server 700, robot 710, and/or robot 720 to perform one or more operations, as described below in greater detail. It will be appreciated that, in embodiments where edge server 700, robot 710, and/or robot 720 are part of another computing device, the components of edge server 700, robot 710, and/or robot 720 may be shared with, or the same as, the host device.

Memory 704, 714, 724 can include one or more devices (e.g., memory units, memory devices, storage devices, etc.) for storing data and/or computer code for completing and/or facilitating the various processes described in the present disclosure. In some embodiments, memory 704, 714, 724 includes tangible (e.g., non-transitory), computer-readable media that stores code or instructions executable by processors 702, 712, 722. Tangible, computer-readable media refers to any physical media that is capable of providing data that causes a respective one of edge server 700, robot 710, and/or robot 720 to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 704, 714, 724 can include RAM, ROM, hard drive storage, temporary storage, non-volatile memory, flash memory, optical memory, or any other suitable memory for storing software objects and/or computer instructions. Memory 704, 714, 724 can include database components, object code components, script components, or any other type of information structure for supporting the various activities and information structures described in the present disclosure. Memory 704, 714, 724 can be communicably connected to processors 702, 712, 722, such as via processing circuit, and can include computer code for executing (e.g., by processors 702, 712, 722, respectively) one or more processes described herein.

While shown as individual components, it will be appreciated that processors 702, 712, 722 and/or memory 704, 714, 724 can be implemented using a variety of different types and quantities of processors and memory. For example, each of processors 702, 712, 722 may represent a single processing device or multiple processing devices. Similarly, each of memory 704, 714, 724 may represent a single memory device or multiple memory devices. Additionally, in some embodiments, any of edge server 700, robot 710, and/or robot 720 may be implemented within a single computing device (e.g., one server, one housing, etc.). In other embodiments, any of edge server 700, robot 710, and/or robot 720 may be distributed across multiple servers or computers (e.g., that can exist in distributed locations). For example, edge server 700 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers.

Additionally, each of edge server 700, robot 710, and robot 720 are shown to include a communications interface 706, 716, 726, respectively, that facilitates communication of data, control signals, and/or other information. For example, communications interface 716 of 'Robot A' can provide means for transmitting data to, or receiving data from, edge server 700 and/or robot 720. Accordingly, communications interfaces 706, 716, 726 can be or can include a wired or wireless communications interface (e.g., jacks, antennas, transmitters, receivers, transceivers, wire terminals, etc.) for conducting data communications, or a combination of wired and wireless communication interfaces. In some embodiments, communications via communications interfaces 706, 716, 726 are direct (e.g., local wired or wireless communications) or via a network (e.g., a WAN, the Internet, a cellular network, etc.). For example, communications interfaces 706, 716, 726 may include one or more Ethernet ports for communicably coupling to a network (e.g., the Internet). In another example, communications interfaces 706, 716, 726 can include a Wi-Fi transceiver for communicating via a wireless communications network. In yet another example, communications interfaces 706, 716, 726 may include cellular or mobile phone communications transceivers.

In some implementations, each of robots 710, 720, 730 can also include one or more actuators—shown as actuators 718, 728—that can be controlled by processors 712, 722 based on instructions from memory 714, 724, respectively. In other words, processors 712, 722 can execute instructions from memory 714, 724, respectively, to control actuators 718, 728. In some implementations, actuators 718, 728 are components of robots 710, 720 themselves. In other implementations, actuators 718, 728 are external to robots 710, 720, but are still controlled by robots 710, 720. In an industrial robot, for example, actuators 718, 728 may include motors, servos, linear actuators, and/or any other component(s) that can cause the robot(s) to move and/or to manipulate a material/component for production.

Generally, the MRS shown in FIG. 7, and the components thereof, can be configured to implement the AI network methodology and corresponding processes described herein. To this point, robots 710, 720, and/or 730 may be configured to form "communities" via social networking in order to perform tasks (e.g., fabricating a product). Within a "community," robots can share social evidence/data for making control decisions. In addition, each of robots 710, 720, and 730 can communicate to edge server 700—either directly or through a network and/or gateway device—to report trust opinions, operating and configuration data, and the like. Additionally, edge server 700 may provide commands, configuration data, and other information to robots 710, 720, and 730. In some implementations, edge server 700 can identify one or more of robots 710, 720, and 730 that require maintenance and/or can track maintenance statuses, decisions, and/or history for robots 710, 720, and 730.

Figure 8:
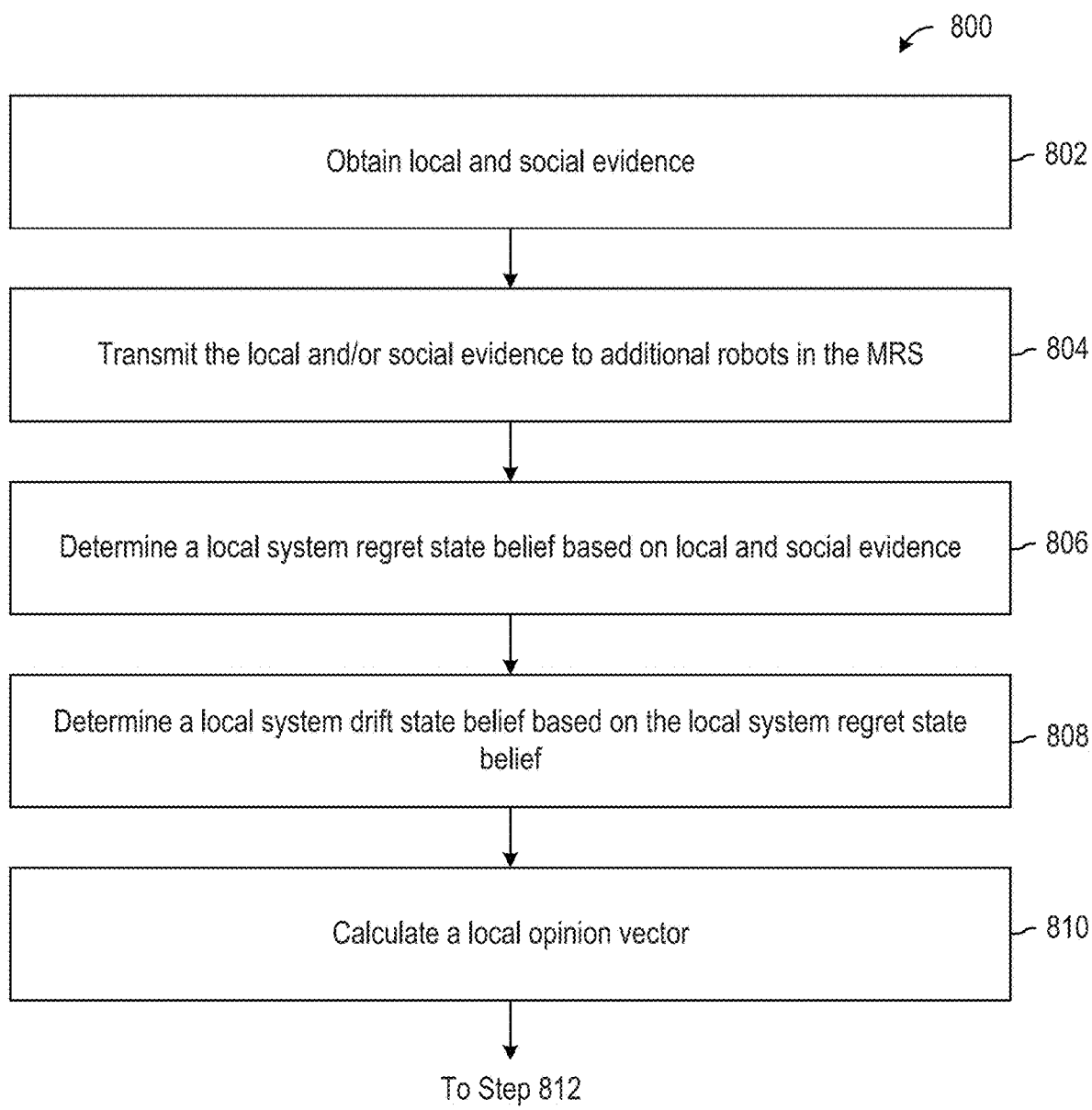
FIG. 8 is a flow chart of a process for controlling or operating a robot in an MRS, according to some implementations.
Figure 8:
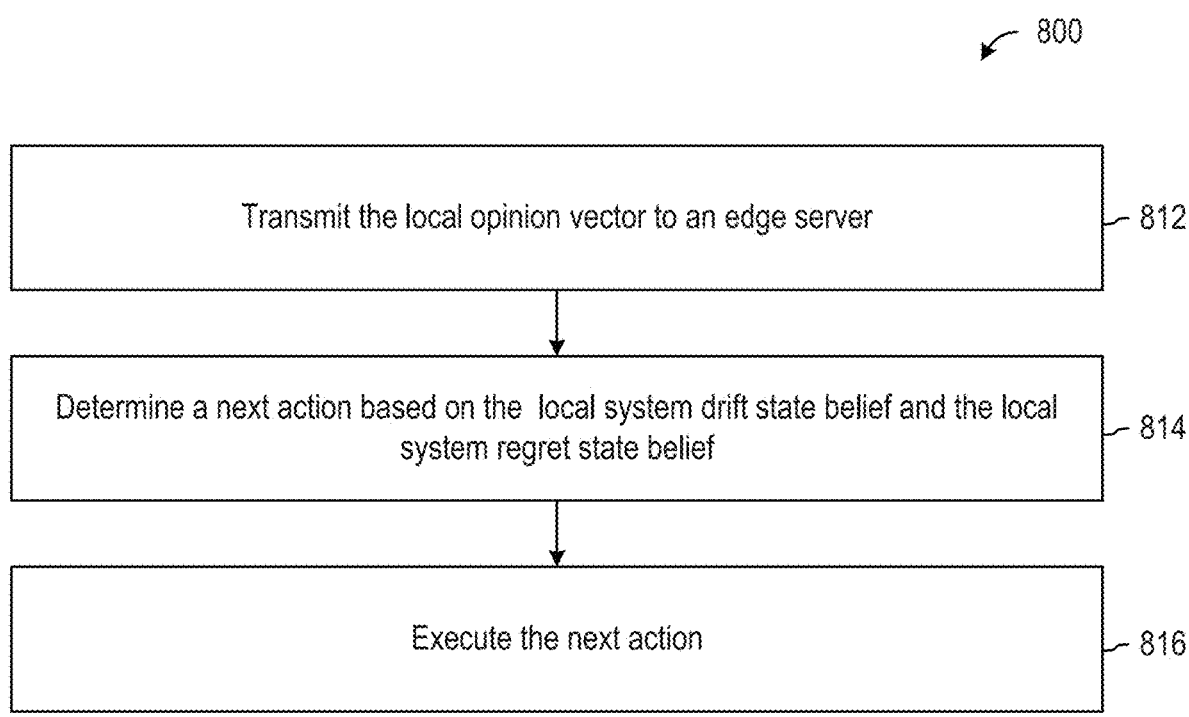

Referring now to FIG. 8, a flow chart of a process 800 for controlling or operating a robot in an MRS is shown, according to some implementations. Generally, process 800 is implemented by the MRS of FIGS. 1, 4, and/or 7, as described above. In particular, process 800 may be implemented by each/any of robots 710, 720, and 730. In some implementations, one or more steps of process 800 may be performed by edge server 700. It will be appreciated that certain steps of process 800 may be optional and, in some implementations, process 800 may be implemented using less than all of the steps. It will also be appreciated that the order of steps shown in FIG. 8 is not intended to be limiting.

At step 802, local and/or social evidence is obtained by a robot in a MRS. In some implementations, local evidence is obtained by the robot itself. In some such implementations, the local evidence includes a previously determined or historical local system regret state belief determined by the robot. For example, the local evidence can include a local system regret state belief determined at a previous time step. In some implementations, the local evidence includes a local system drift state belief determined by the robot at the previous time step. In some implementations, the local evidence includes measurements of a physical product obtained by the robot.

In some implementations, social evidence is obtained/ received from at least one additional robot in a community or social network with the robot. To this point, at step 804, local evidence (e.g., evidence/data collected by a first robot in a community) and/or social evidence (e.g., current and/or historical data received by the first robot from other robots in the community) can be transmitted to other robots in the community. Notably, local and/or social evidence is transmitted between robots in a social community without retransmission and back-forwarding. In some implementations, social evidence may be obtained from other robots in the first robot's community within a social network. These other robots may be robots that are local to the first robot and/or that are configured to operate in conjunction with the first robot to, for example, fabricate a product. In some implementations, the social evidence indicates a state of a product being fabricated or manipulated by the MRS as determined by the additional robot(s). In some implementations, the social evidence includes measurements of a physical product obtained by the additional robot(s) at a previous time step.

At step 806, a local system regret state belief is determined based on the local and/or social evidence. Generally, the local system regret state belief is an estimation of a system regret state for the MRS, as described in detail above. In some implementations, the local system regret state belief is determined using a Bayesian network. At step 808, a local system drift state belief is determined based on the local system regret state belief. Generally, the local system drift state belief is an estimate of a system drift state for the MRS, as described in detail above. In some implementations, is determined using a stochastic gradient descent (SGD) network with Huber loss.

At step 810, a local opinion vector is optionally calculated. The local opinion vector—or local trust opinion—is a vector that represents a level of trust to the other robots in the MRS and/or in a social community with the first robot. In some implementations, the opinion vector is calculated from the local system drift state belief. Subsequently, at step 812, the local opinion vector is optionally transmitted to an edge server or other remote/supervisory device. For example, the local opinion vector can be transmitted to an edge server in order for the edge server to form 'hard' opinions that can be used to make maintenance and/or configuration control decisions.

At step 814, a next action for the robot is determined based on the local system regret state belief and local system drift state belief. Generally, the next action is an action that the robot will take at the current or a next time step. In some implementations, the next action is determined using a reinforcement learning model. In some such implementations, the next action may be further determined by a reward value that is provided as an input to the reinforcement learning model. In some implementations, the reward value is provided by a downstream inspection and/or quality control system. The reward value may, for example, indicate a quality of a product that was produced, at least in part, by the robot. Subsequently, at step 816, the next action is executed. For example, the robot may execute the next action and/or a control signal may be sent to the robot to initiate the next action.

Experimental Results

To evaluate the resiliency of distributed social learning in an MRS, a stochastic environment with abrupt disturbances was developed. As discussed above, a resilient system on top of robust against stochastic dynamics, can preserve Φ and Yield under unexpected disturbances (e.g., that take place accidentally). Abrupt disturbance is modeled as an instant system regret state $e_{sys}^t$ change, potentially caused by a machine part broken, a wireless outage, cyberattacks on wireless network or robot applications, and the like. In this example, the number of instances, timeslots, number of robots, and robots that are affected were randomly selected. For the selected robots, $e_{m,n}^t$ was increased by ten when the robot had a positive $w_{m,n}^t$ and decrease by ten in other instances. Four groups of computational experiments are performed to demonstrate successfulness, scalability, and resiliency performance of the proposed AI network methodology.

TABLE I

Parameters of Resilience Experiment

| Parameters | Values |
| --- | --- |
| M | 6 |
| N | (5, 5, 5, 5, 5, 5) |
| ω | (6, 5, 6, 5, 7, 6) |
| L | $\mathcal{U}(1, 5)$ |
| $\lambda_m^l$ | $\mathcal{U}(0, 8)$ |
| Reconfigurations | 10 |
| Interval (in timeslots) | 40 |
| Social composite degree | (6, 0.2, 0.8) |
| $\gamma_R$ | 5 |
| MTTF | 200 |
| Δ | 10 |
| z | 5 |

Figure 9:
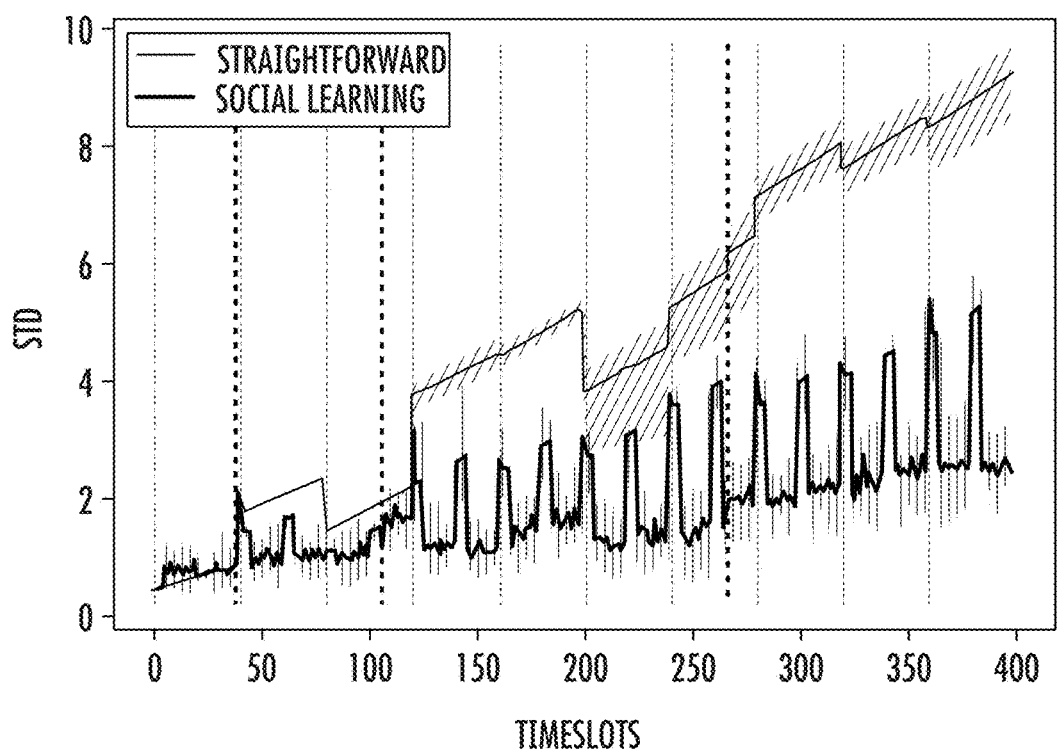
FIG. 9 is a graph illustrating average quality factor, D, on an example 30-robot MRS, according to some implementations.
Figure 10:
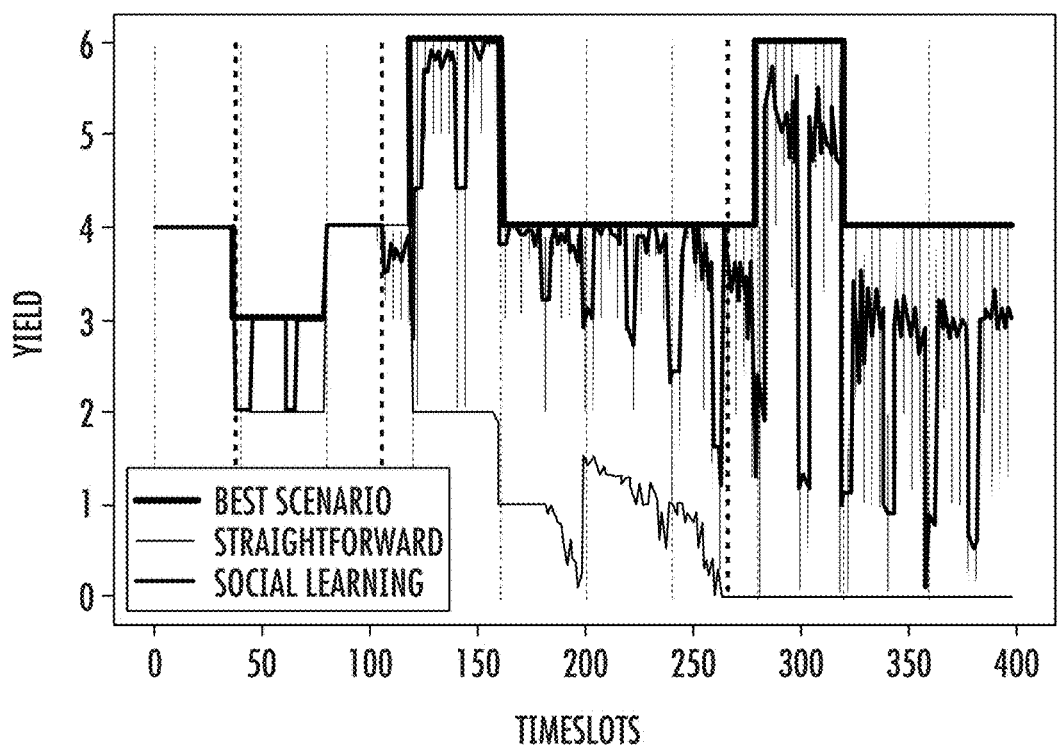
FIG. 10 is a graph illustrating system yield over time for an example 30-robot MRS, according to some implementations.

Given the parameters in Table I, the resilience of 30-robot MRS was evaluated. FIGS. 9 and 10 illustrate the results of these evaluations over 400 timeslots. The "straightforward" group represents a fully distributed physical MRS network with edge server assigned tasks in a cyber domain. Three abrupt disturbances are indicated by vertical dash lines and one robot was subjected to a random and significant change in regret. FIG. 9 shows that drifting of the robot's regret increases $\Phi_{straightforward}$ overtime, relegating the quality of the finished products. Meanwhile, FIG. 10 shows that, during the $7^{th}$ reconfiguration, the straightforward group encounters point failures that all finished products are not counting into the Yield. However, a social learning group preserves $\Phi_{social\ learning}$ overtime. The Bayesian learning phase shows a sudden increase of the $\Phi_{social\ learning}$, which indicates that system regret state is potentially relegated to system performance and that the AI network preserves system performance. Further, sudden increases can be observed in both FIGS. 9 and 10, which show abrupt disturbances at timeslots 38, 106, and 267 that decrease the system performance. Yet, the resilient social learning group adapted to the disturbance and recovered performance (e.g., back to a theoretical "ideal"), shown as a "best scenario" group in FIG. 10.

Figure 11:
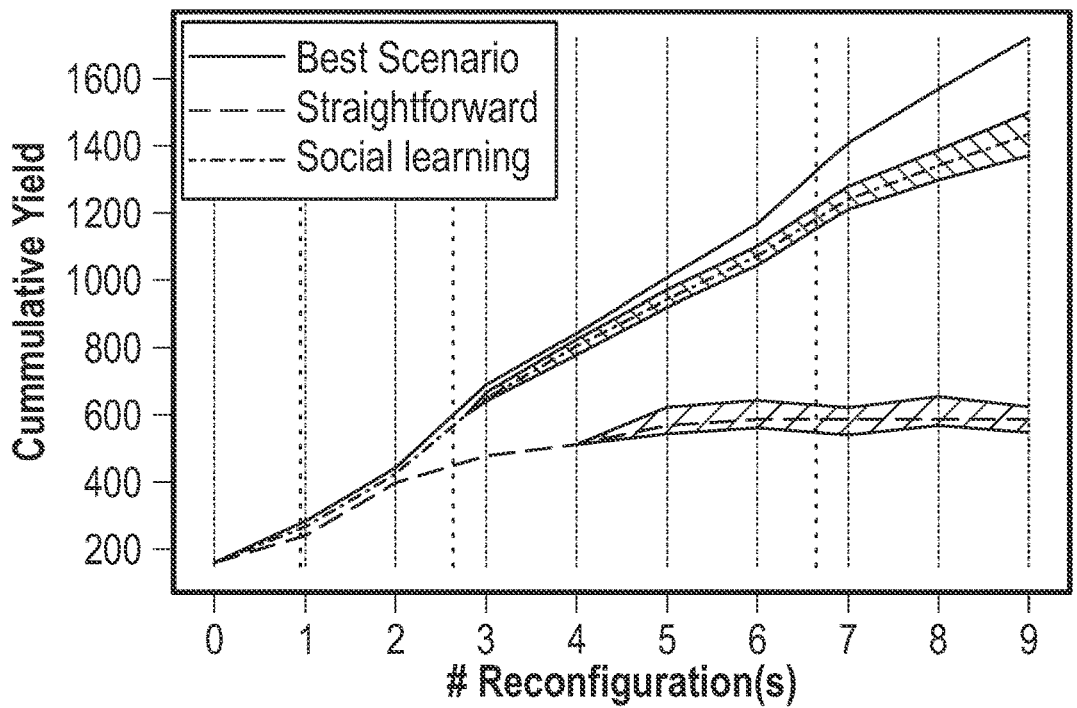
FIG. 11 is a graph illustrating cumulative system yield for an example 30-robot MRS, according to some implementations.
Figure 12:
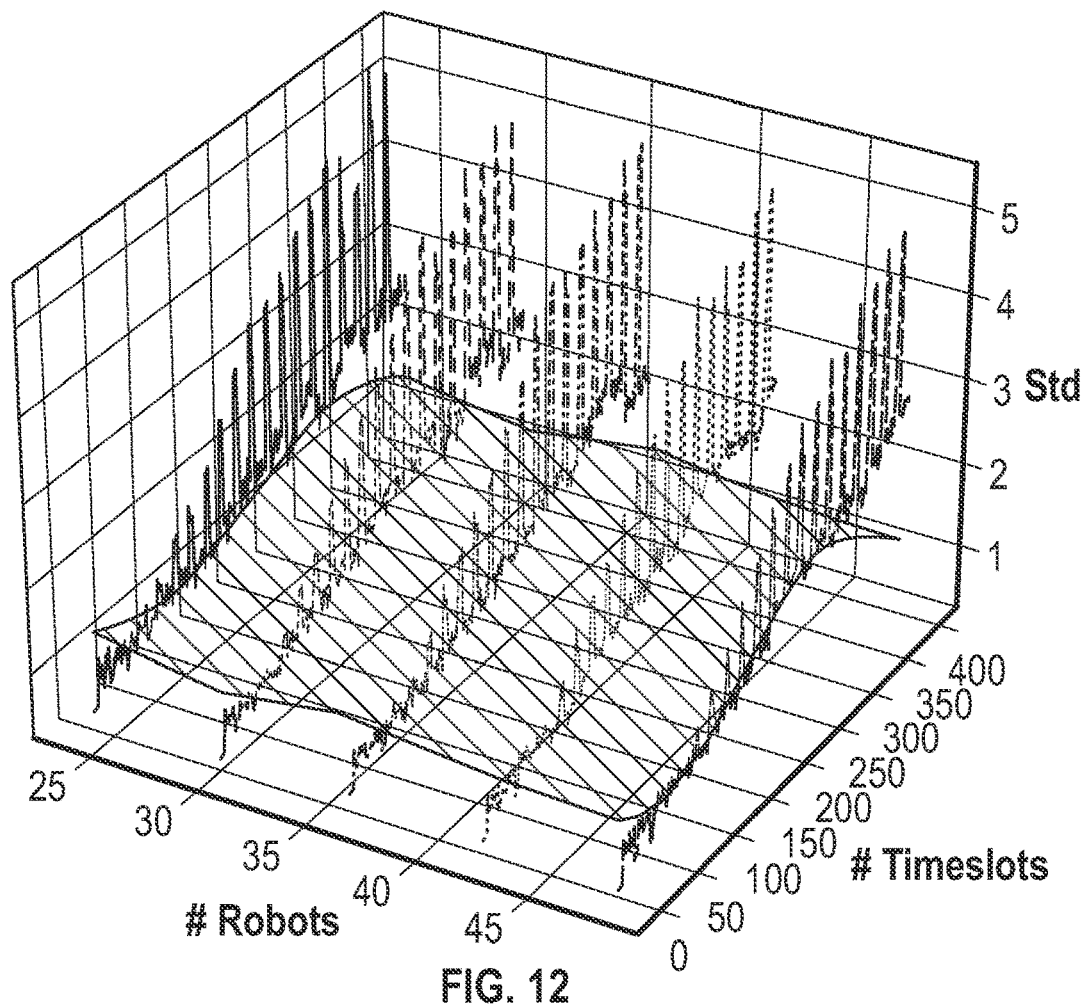
FIG. 12 is a graph illustrating average quality factor, D, of an example 24-, 30-, 36-, 42-, and 48-robot MRSs, according to some implementations.

To further demonstrate the scalability of the proposed AI network methodology, computational experiments were carried out using the same parameters in Table I with various groups of robots as shown in Table II. The results of these additional experiments are shown in FIG. 11 and FIG. 12. Similarly, three random abrupt disturbances happen to all groups. The results show that the resiliency of preserving system performance is achieved on all five groups over time. The Φ performance with Inter Quartile Range (IQR) outliers removed from a hyper-plain is shown in FIG. 10. As shown, Φ performance does not fluctuate much under stochastic dynamics and abrupt disturbances for all groups. This demonstrates that the proposed AI network is scalable over robot number and time.

TABLE II

Parameters of Scalability Experiment

| Number of Robots | N | Composite Social Degree |
|---|---|---|
| 24 | (4, 4, 4, 4, 4, 4) | (5, 0.2, 0.8) |
| 30 | (5, 5, 5, 5, 5, 5) | (6, 0.2, 0.8) |
| 36 | (6, 6, 6, 6, 6, 6) | (6, 0.2, 0.8) |
| 42 | (7, 7, 7, 7, 7, 7) | (7, 0.2, 0.8) |
| 48 | (8, 8, 8, 8, 8, 8) | (7, 0.2, 0.8) |

Figure 13A:
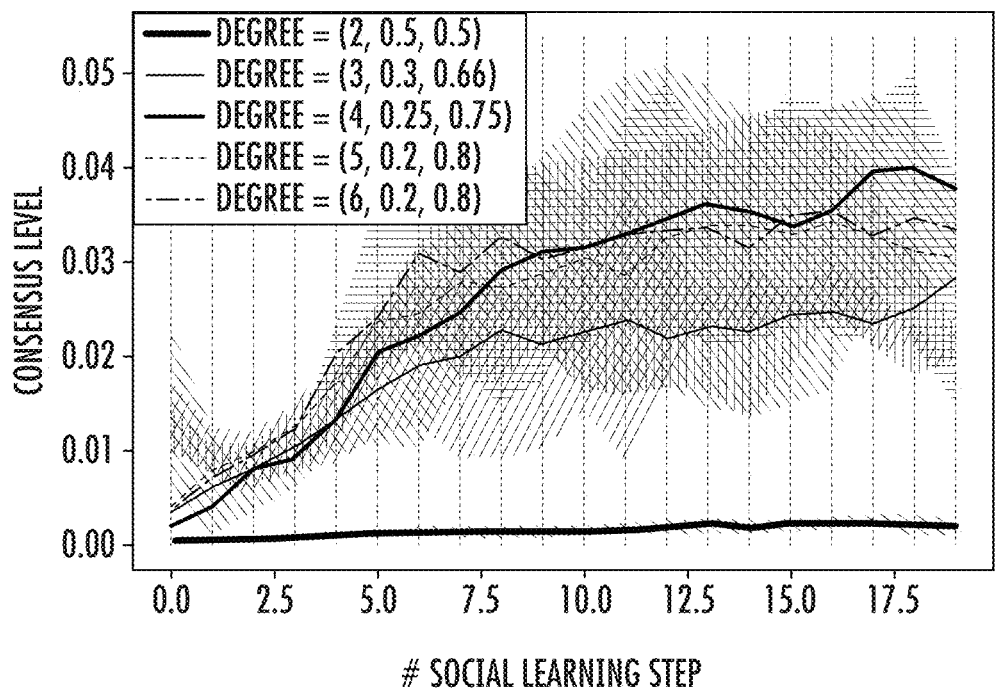
FIGS. 13A-13C are graphs illustrating consensus levels in an example 30-robot MRS, according to some implementations.
Figure 13B:
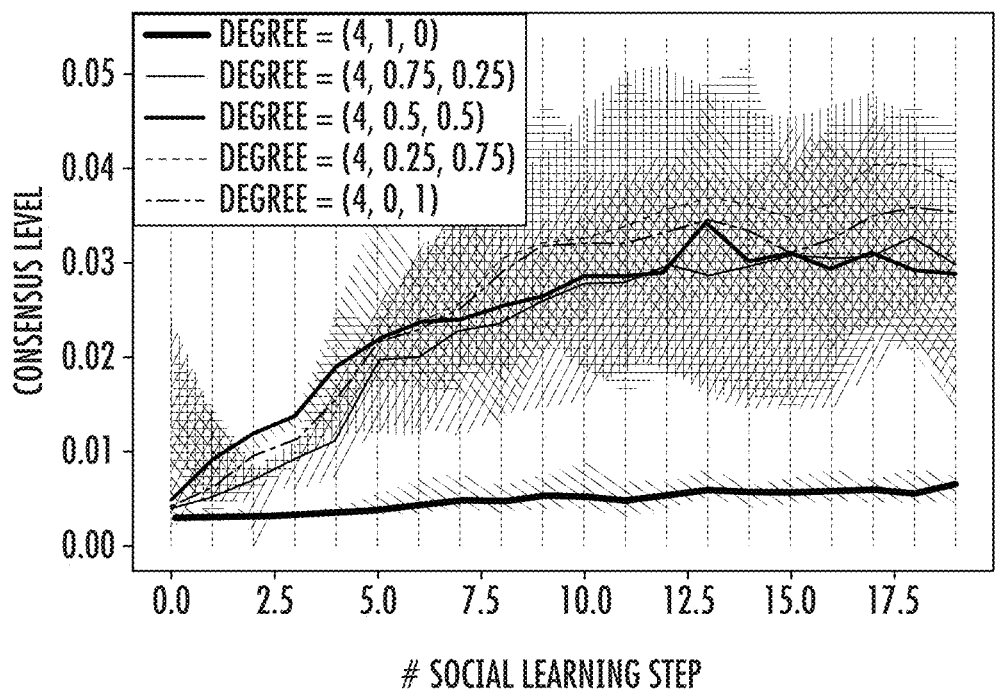
Figure 13C:
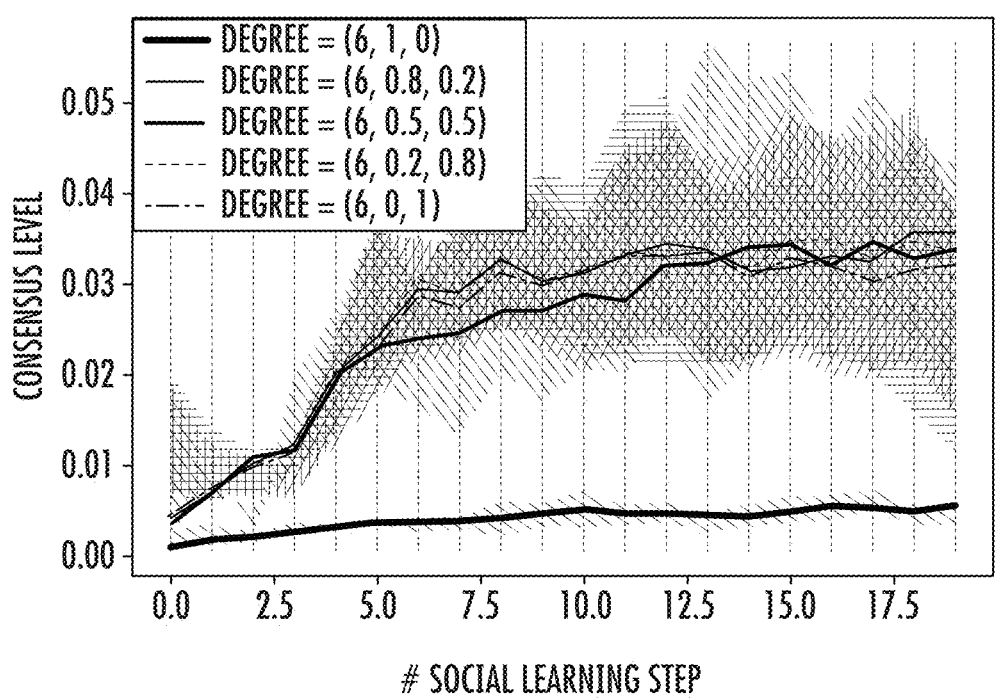

As discussed above, maintenance decisions are generally made on an edge server or other supervisory system based on trust-based soft opinion decisions from each robot. Social network and partial observability lead to incomplete opinion vectors, which makes consensus decision challenging. Thus, an experiment was conducted to explore the rule of thumb about composite social degree for resilient consensus decision. FIGS. 13A-13C show the mean of opinion matrix times the effective opinion values given by (22), in which $f_O$ represents a ratio of successful robot opinions over all robots since opinion vector in not complete due to partial observability.

$$\text{Consensus level} = \frac{\sum_{(m,n),(i,j) \in G_{cyb}} cr^t_{m,n;i,j}}{\|CR^t\|} \cdot \frac{\sum_{m,n \in G_{(cyb)}} f_O(o^t_{m,n;sys})}{\sum_{i \in M} N_i} \quad (22)$$

This treatment makes the results reflect both the quality and quantity of consensus correlations. FIG. 13A explores the rule of thumb about total degree d. With increasing total degree d and similar k value (noting that linked numbers are discrete so that it is difficult to get results with identical k values), the converged consensus level ranges from 0.03 to 0.05. This shows that a greater total degree d results in a greater level of consensus. FIGS. 13B and 13C explore the rule of thumb about k. Specifically, FIG. 13B shows under d=4, λ1 m~U(0.8), ω=(6, 5, 6, 5, 7, 6), and that there is a considerable difference shown at degree=(4, 1, 0) that has no inter-type links. However, FIG. 13C shows when d is large enough, k is no longer a major parameter that affects consensus level. To summarize, the rule of thumb lies in a biased choice of less intra-type robot links and more inter-type robot links, while maintaining a rather small total degree d.

Figure 14B:
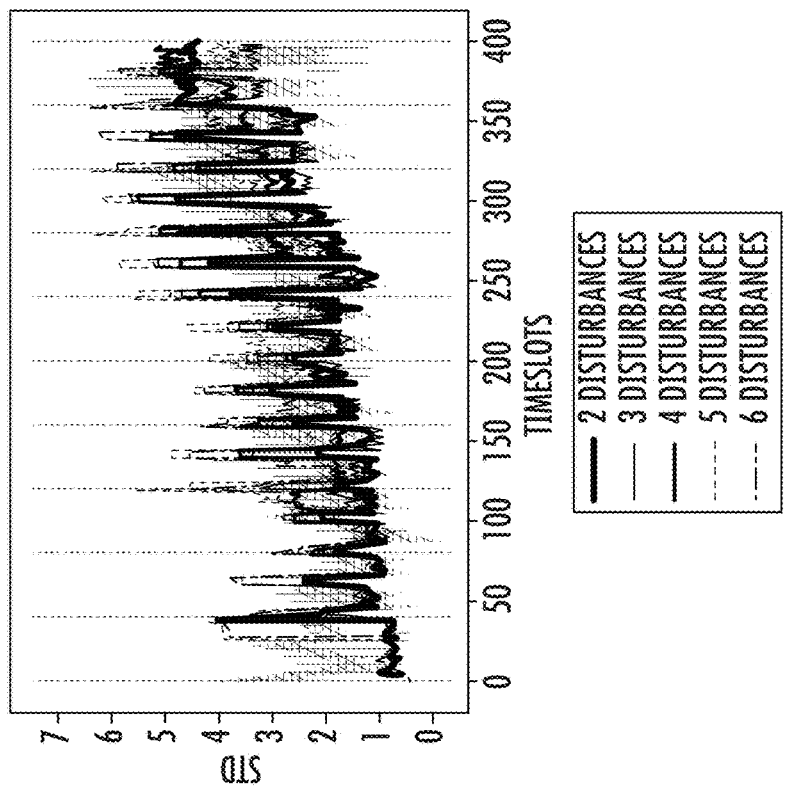
FIGS. 14A and 14B are graphs illustrating the results of a resilience experiment regarding a number of disturbances on an example MRS, according to some implementations.
Figure 14A:
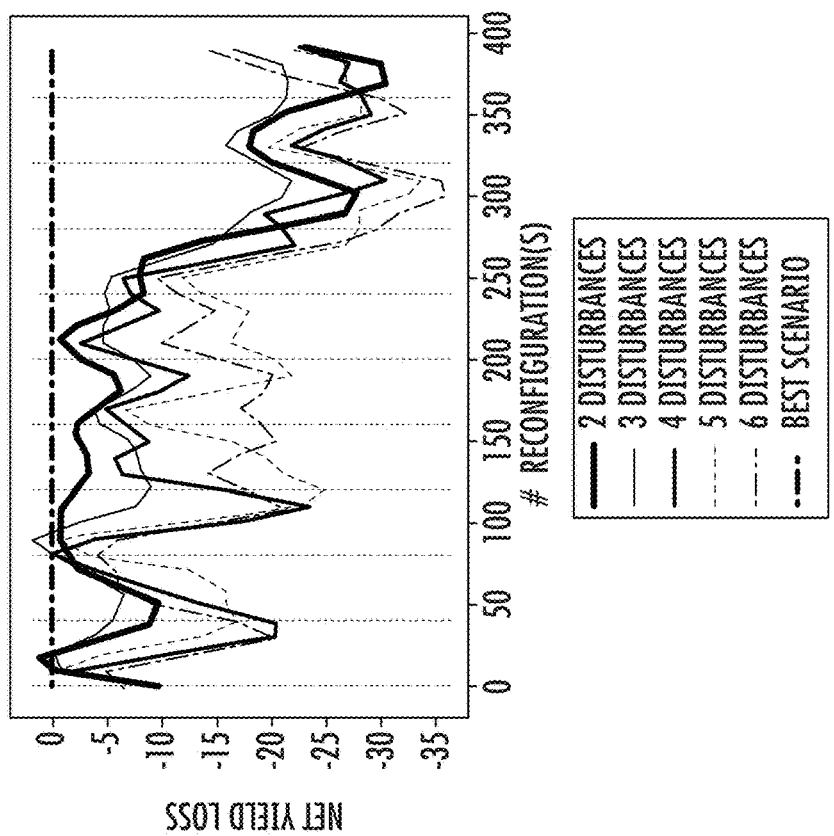
Figure 15B:
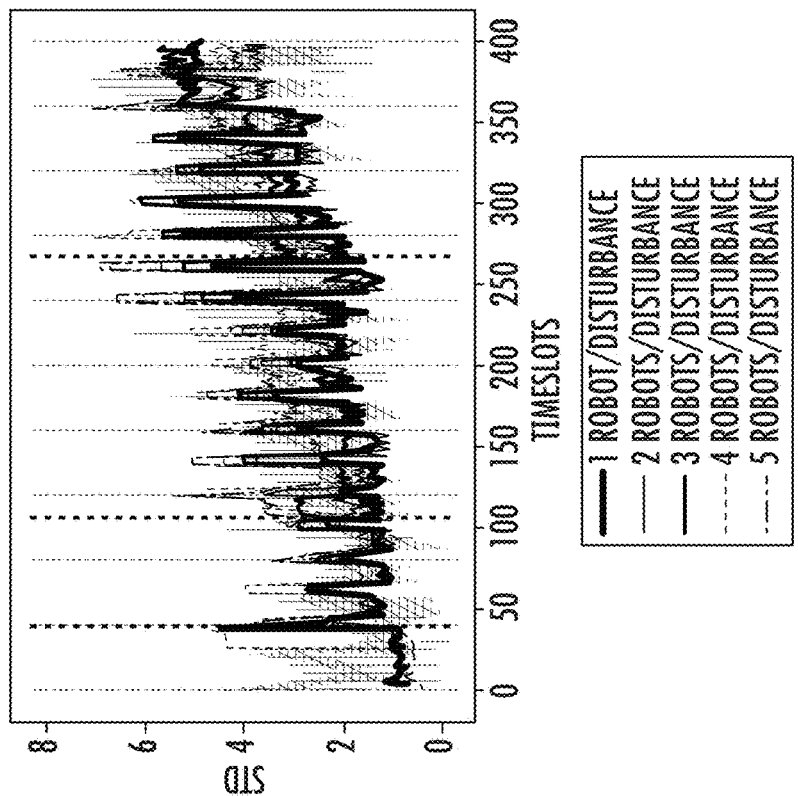
FIGS. 15A and 15B are graphs illustrating the results of a resilience experiment regarding a scale of disturbances on an example MRS, according to some implementations.

Two additional experiments were conducted that focus on abrupt disturbances to demonstrate the resilience performance of the proposed AI network methodology. FIGS. 14A and 14B show the results from different frequency of the abrupt disturbances. With the same parameters in Table I, five groups of data show that different numbers of abrupt disturbances take place, with larger number suggesting more frequent abrupt disturbances. Similarly, FIGS. 15A and 15B shows the results from the scale of abrupt disturbances, in which five groups of data shows different number of robots in three abrupt disturbances suddenly have significant regret so that larger number suggesting larger scale abrupt disturbances happen.

Figure 15A:
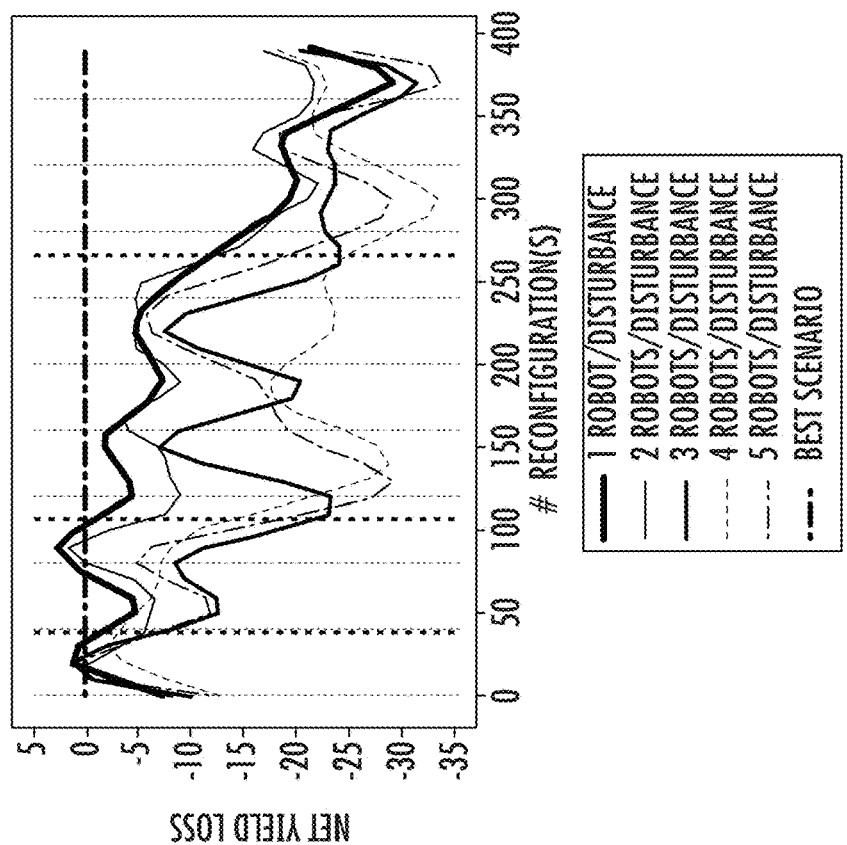

The Φ data in FIGS. 14A and 15A shows that more frequent, large scale, abrupt disturbances bring more serious performance decline. Also, both experiments show recovery of Φ, and tendency to improve back to the value before disturbances. Meanwhile, FIGS. 14B and 15B use "Net Yield loss" given by the Yield–Yield$_{best\_scenario}$, in which Yield$_{best\_scenario}$ are theoretical values from MRTA. Thus, the proposed AI network methodology described herein is resilient against a range of frequency and scale and has a strong tendency for preserving and recovering from drops in performance.

Configuration of Certain Implementations

The construction and arrangement of the systems and methods as shown in the various implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed method.

What is claimed is:

1. A method of operating a first robot in a multi-robot system, wherein the first robot and at least one additional robot of the multi-robot system form a social community in a network, the method comprising:
    determining, by the first robot, a local system regret state belief based on local evidence obtained by the first robot and social evidence provided by the at least one additional robot in the social community, wherein the local system regret state belief is an estimation of a system regret state for the multi-robot system;
    determining, by the first robot, a local system drift state belief based on the local system regret state belief, wherein the local system drift state belief is an estimate of a system drift state for the multi-robot system;
    generating, by the first robot, an opinion vector representing a level of trust to the at least one additional robot in the social community, wherein the opinion vector is calculated from the local system drift state belief;
    receiving, by a remote computing device, the opinion vector;
    generating, by the remote computing device, a trust matrix based at least in part on the opinion vector and at least another received opinion vector;
    responsive to detecting, by the remote computing device and based at least in part on the trust matrix, a point failure resulting in product defects, initiating a corrective action within the multi-robot system, wherein the corrective action comprises at least one of forcing a robot calibration or scheduling maintenance;
    determining, by the first robot, a next action relating to a manufacturing or fabrication task based on the local system regret state belief and the local system drift state belief; and
    executing, by the first robot, the next action.

2. The method of claim 1, further comprising:
    transmitting, by the first robot, the opinion vector to the remote computing device.

3. The method of claim 1, wherein the local evidence comprises a least one of a local system regret state belief and/or a local system drift state belief determined by the first robot at a previous time step and measurements of a physical product obtained by the first robot.

4. The method of claim 1, wherein the social evidence received from the at least one additional robot indicating a state of a product being fabricated or manipulated by the multi-robot system as determined by the at least one additional robot.

5. The method of claim 1, wherein the social evidence comprises measurements of a physical product obtained by the at least one additional robot at a previous time step.

6. The method of claim 1, wherein the next action is determined using a reinforcement learning model.

7. The method of claim 6, wherein determining the next action is further based on a reward value provided by the remote computing device.

8. The method of claim 1, wherein the local system regret state belief is determined using a Bayesian network.

9. The method of claim 1, wherein the local system drift state belief is determined using a stochastic gradient descent (SGD) network with Huber loss.

10. The method of claim 1, wherein the social network is a partially connected network that shares hypervertex set $\{R_{m,n}\}$ with the physical network, $G_{phy}$.

11. A control system for a first robot in a multi-robot system, wherein the first robot and at least one additional robot of the multi-robot system form a social community in a network, the control system comprising:
    a processor; and
    memory having instructions stored thereon that, when executed by the processor, cause the control system to:
        determine a local system regret state belief based on local evidence obtained by the first robot and social evidence provided by the at least one additional robot in the social community, wherein the local system regret state belief is an estimation of a system regret state for the multi-robot system;
        determine a local system drift state belief based on the local system regret state belief, wherein the local system drift state belief is an estimate of a system drift state for the multi-robot system;
        generate an opinion vector representing a level of trust to the at least one additional robot in the social community, wherein the opinion vector is calculated from the local system drift state belief, and wherein the opinion vector is transmitted to a remote computing device configured to: (i) generate a trust matrix based at least in part on the opinion vector and at least another received opinion vector, and (ii) responsive to detecting, based at least in part on the trust matrix, a point failure resulting in product defects, initiate a corrective action within the multi-robot system, wherein the corrective action comprises at least one of forcing a robot calibration or scheduling maintenance;

determine a next action for the first robot relating to a manufacturing or fabrication task based on the local system regret state belief and the local system drift state belief; and control the first robot to execute the next action.

12. The control system of claim 11, wherein the local evidence comprises at least one of a local system regret state belief and/or a local system drift state belief determined by the first robot at a previous time step and measurements of a physical product obtained by the first robot.

13. The control system of claim 11, wherein the social evidence received from the at least one additional robot indicating a state of a product being fabricated or manipulated by the multi-robot system as determined by the at least one additional robot.

14. The control system of claim 11, wherein the social evidence comprises measurements of a physical product obtained by the at least one additional robot at a previous time step.

15. The control system of claim 11, wherein the next action is determined using a reinforcement learning model, wherein determining the next action is further based on a reward value provided by a remote device.

16. The control system of claim 11, wherein the local system regret state belief is determined using a Bayesian network.

17. The control system of claim 11, wherein the local system drift state belief is determined using a stochastic gradient descent (SGD) network with Huber loss.

18. A non-transitory computer readable medium having instructions stored thereon that, when executed by a processor, cause a device to:

determine, for a first robot in a multi-robot system, a local system regret state belief, wherein the first robot and at least one additional robot of the multi-robot system form a social community in a network, wherein the local system regret state belief is determined based on local evidence obtained by the first robot and social evidence provided by the at least one additional robot in the social community, and wherein the local system regret state belief is an estimation of a system regret state for the multi-robot system;

determine, for the first robot, a local system drift state belief based on the local system regret state belief, wherein the local system drift state belief is an estimate of a system drift state for the multi-robot system;

generate, for the first robot, an opinion vector representing a level of trust to the at least one additional robot in the social community, wherein the opinion vector is calculated from the local system drift state belief, and wherein the opinion vector is transmitted to a remote computing device configured to: (i) generate a trust matrix based at least in part on the opinion vector and at least another received opinion vector, and (ii) responsive to detecting, based at least in part on the trust matrix, a point failure resulting in product defects, initiate a corrective action within the multi-robot system, wherein the corrective action comprises at least one of forcing a robot calibration or scheduling maintenance;

determine a next action for the first robot relating to a manufacturing or fabrication task based on the local system regret state belief and the local system drift state belief; and control the first robot to execute the next action.

* * * * *